US009897849B2

(12) United States Patent
Yoshihara et al.

(10) Patent No.: US 9,897,849 B2
(45) **Date of Patent: *Feb. 20, 2018**

(54) PROTECTIVE FILM FOR POLARIZING PLATE

(75) Inventors: Masanori Yoshihara, Tokyo (JP); Tetsuya Toyoshima, Tokyo (JP); Kohei Arakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 1398 days.

This patent is subject to a terminal disclaimer.

(21) Appl. No.: 11/922,598

(22) PCT Filed: Jun. 21, 2006

(86) PCT No.: PCT/JP2006/312396

§ 371 (c)(1), (2), (4) Date: Mar. 19, 2008

(87) PCT Pub. No.: WO2006/137428

PCT Pub. Date: Dec. 28, 2006

(65) Prior Publication Data

US 2009/0237786 A1 Sep. 24, 2009

(30) Foreign Application Priority Data

Jun. 21, 2005 (JP) ................................ 2005-181265
Jun. 21, 2005 (JP) ................................ 2005-181267
(Continued)

(51) Int. Cl.
*G02B 1/08* (2006.01)
*G02F 1/1335* (2006.01)
(Continued)

(52) U.S. Cl.
CPC ....... *G02F 1/133528* (2013.01); *G02B 1/105* (2013.01); *G02B 1/14* (2015.01);
(Continued)

(58) Field of Classification Search
CPC ..... B32B 27/365; B32B 27/302; B32B 27/08; G02F 1/133528; G02F 2201/50; G02B 1/14; G02B 1/105
See application file for complete search history.

(56) References Cited

U.S. PATENT DOCUMENTS 4,540,623 A * 9/1985 Im et al. ................. 264/173.12
4,925,259 A 5/1990 Emmett
(Continued)

FOREIGN PATENT DOCUMENTS

EP 1 333 449 A2 8/2003
JP 06099547 A * 4/1994
(Continued)

OTHER PUBLICATIONS

Machine translation of JP08062419A published on Mar. 8, 1996.*
(Continued)

*Primary Examiner* — Monique Jackson
(74) *Attorney, Agent, or Firm* — Birch, Stewart, Kolasch & Birch, LLP

(57) ABSTRACT

A protective film for polarizing plate made by laminating k layers (k being an integer of 2 to 7) of thermoplastic resin, in which a refractive index $n_i(\lambda)$ at a wavelength X in the range of 380 to 780 nm of the i th thermoplastic resin layer as well as a refractive index $n_{i+1}(\lambda)$ at a wavelength λin the range of 380 to 780 nm of the i+1 th thermoplastic resin layer have a relationship of In $|n_i(\lambda)-n_{i+1}(\lambda)|\leq 0.045$ (i being an integer of 1 to k−l); and a polarizing plate comprising the protective film and a polarizer. The protective film has an in-plane retardation Re at a wavelength λof 550 nm of 50 nm or less, and is obtained by coextruding at least one layer (A) of thermoplastic resin having of a negative photoelastic coefficient with at least one layer (B) of thermoplastic resin having a positive photoelastic coefficient.

19 Claims, 5 Drawing Sheets

40
22
23
21
23
22
20
10
30

(30) Foreign Application Priority Data

| | | | |
|---|---|---|---|
| Jun. 21, 2005 | (JP) | ................................ | 2005-181268 |
| Jun. 21, 2005 | (JP) | ................................ | 2005-181269 |
| Jun. 21, 2005 | (JP) | ................................ | 2005-181270 |
| Oct. 20, 2005 | (JP) | ................................ | 2005-306429 |

(51) Int. Cl.
*G02B 1/14* (2015.01)
*G02B 1/10* (2015.01)

(52) U.S. Cl.
CPC ... *G02F 2201/50* (2013.01); *Y10T 428/24612* (2015.01); *Y10T 428/24942* (2015.01)

(56) References Cited

U.S. PATENT DOCUMENTS

| | | | | |
|---|---|---|---|---|
| 5,122,905 | A * | 6/1992 | Wheatley et al. ............ | 359/586 |
| 6,080,467 | A * | 6/2000 | Weber et al. ................ | 428/212 |
| 6,808,811 | B1 | 10/2004 | Sawada et al. | |
| 7,875,341 | B2 * | 1/2011 | Toyoshima et al. .......... | 428/212 |
| 7,998,563 | B2 * | 8/2011 | Yoshihara et al. ............ | 428/212 |
| 8,537,309 | B2 * | 9/2013 | Toyoshima et al. ............ | 349/96 |
| 2002/0005925 | A1 * | 1/2002 | Arakawa .............. | G02B 5/3083 349/117 |
| 2004/0219364 | A1 * | 11/2004 | Shirk et al. ................ | 428/411.1 |
| 2007/0153162 | A1 * | 7/2007 | Wright et al. .................. | 349/96 |

FOREIGN PATENT DOCUMENTS

| | | | | |
|---|---|---|---|---|
| JP | 08062419 | A | * | 3/1996 |
| JP | 2000-206303 | A | | 7/2000 |
| JP | 2001-174637 | A | | 6/2001 |
| JP | 2001-272535 | A | | 10/2001 |
| JP | 2002-249600 | A | | 9/2002 |
| JP | 2002-303726 | A | | 10/2002 |
| JP | 2003-57439 | A | | 2/2003 |
| JP | 2003-291236 | A | | 10/2003 |
| JP | 2004-345333 | A | | 12/2004 |
| JP | 2005-115085 | A | | 4/2005 |

OTHER PUBLICATIONS

"Glass Transition Temperature", Polymer Properties Database, downloaded from polymerdatabase.com on Jun. 7, 2016.*

Refractive Index of Polymers by Index, Scientific Polymer, Inc., downloaded from scientificpolymer.com on Jun. 21, 2016.*

"Modulus of Elasticity or Young's Modulus—and Tensile Modulus for common Materials", The Engineering ToolBox, downloaded from www.EngineeringToolBox.com on Jun. 21, 2016.*

Machine generated English translation of JP-2005-115085-A having an issue date of Apr. 28, 2005.

Machine generated English translation of JP-2000-206303-A having an issue date of Jul. 28, 2000.

* cited by examiner

PROTECTIVE FILM FOR POLARIZING PLATE

TECHNICAL FIELD

The present invention relates to a protective film for polarizing plate, a polarizing plate and a liquid crystal display, and particularly to a protective film for polarizing plate, a polarizing plate and a liquid crystal display in which there is no defective visibility due to light interference such as interference fringes but which is excellent in scratch resistance and suitable for a liquid crystal display and the like.

BACKGROUND ART

A polarizing plate used in the liquid crystal display or the like is a laminated body of a polarizer and a protective film.

As the polarizer constituting the polarizing plate, a film obtained by having iodine or diachronic dye adsorbed to the film made by a casting method of polyvinyl alcohol and drawn in a boric-acid solution is usually used.

On the other hand, as a protective film constituting the polarizing plate, triacetyl cellulose film is widely used. However, the triacetyl cellulose film is poor in moisture resistance and gas barrier performance, therefore the film is insufficient for the durability, heat resistance, mechanical strength and the like of the polarizing plate.

In order to improve durability and heat resistance of the polarizing plate, use of a protective film other than triacetyl cellulose film is proposed. For example, in Patent Document 1, use of a laminate film comprising a norbornene resin layer and a resin layer with a small haze value as a protective film is proposed. And to obtain a polarizing plate by affixing this protective film with the face of the norbornene resin layer faced with a polarizer containing polyvinyl alcohol is described.

Patent Document 2 proposes a protective film with a small photoelastic constant in which a resin layer having hygroscopicity smaller than that of triacetyl cellulose and a positive photoelastic constant and a resin layer having hygroscopicity smaller than that of triacetyl cellulose and a negative photoelastic constant are laminated. And a polarizing plate obtained by affixing this protective film onto a polarizer containing polyvinyl alcohol is disclosed.

[Patent Document 1] Japanese Patent Laid-Open No. 2005-115085

[Patent Document 2] Japanese Patent Laid-Open No. 2000-206303

DISCLOSURE OF THE INVENTION

Problems to be Solved by the Invention

However, when the protective film obtained only by the prior art disclosed in Patent Document 1 or Patent Document 2 is attached to a liquid crystal display or the like, it might have interference fringes or scratches caused by friction or the like, which causes visibility from an observation side to be defective.

An object of the present invention is to provide a protective film for polarizing plate, a polarizing plate, and a liquid crystal display having no defective visibility due to interference fringes or the like and excellence in scratch resistance and which is suitable for a liquid crystal display and the like.

Means for Solving the Problems

As the result of research by the inventors in order to achieve the above object, the inventors has found that by laminating a film obtained by laminating k layers of thermoplastic resin (k is an integer of 2 or more) in which a refractive index $n_i(\lambda)$ at a wavelength $\lambda$ in the range of 380 to 780 nm of the i th thermoplastic resin layer and a refractive index $n_{i+1}(\lambda)$ at a wavelength $\lambda$ in the range of 380 to 780 nm of the i+1 th thermoplastic resin layer satisfy a specific relationship onto a polarizer, interference fringes becomes hard to occur.

It has been found that by laminating a film with an absolute value of a photoelastic coefficient at $10\times10^{-12}$ $Pa^{-1}$ or less onto a polarizer, a polarizing plate with no defective visibility due to light leakage, uneven color, coloring or the like in the vicinity of an edge of a display screen but excellent in scratch resistance can be obtained.

It has been also found that by laminating a film comprising k layers of thermoplastic resin (k is an integer of 2 or more) including at least one layer of a thermoplastic resin having a negative photoelastic coefficient and at least one layer of a thermoplastic resin having a positive photoelastic coefficient on a polarizer, a polarizing plate with no defective visibility due to light leakage, uneven color, coloring or the like in the vicinity of an edge of a display screen but excellent in scratch resistance can be obtained.

It has been also found that in a polarizing plate obtained by using a film in which every one of thermoplastic resin layers is formed of a material with haze of 0.5% or less and contain amorphous thermoplastic resin and a humidity expansion coefficient $\beta_i$ of the i th thermoplastic resin layer and a humidity expansion coefficient $\beta_{i+1}$ of the i+1 th thermoplastic resin layer satisfy a specific relationship, the polarizer and the protective film are not separated from each other even under an environment with high temperature and high humidity.

It has been also found that a polarizing plate obtained by using a film in which the refractive index $n_i(\lambda)$ at a wavelength $\lambda$ in the range of 380 to 780 nm of the first thermoplastic resin layer located at a position closest to the polarizer and the refractive index $n_b(\lambda)$ at a wavelength $\lambda$ in the range of 380 to 780 nm of polyvinyl alcohol contained in the polarizer satisfy a specific relationship has high contrast and no defective visibility by cords and is excellent in flexibility and scratch resistance.

The present invention was completed based on the above findings.

That is, the present invention includes the following:

(1) A protective film for polarizing plate comprising k layers (k is an integer of 2 or more) of thermoplastic resin laminated, in which a refractive index $n_i(\lambda)$ at a wavelength $\lambda$ in the range of 380 to 780 nm of the i th thermoplastic resin layer and a refractive index $n_{i+1}(\lambda)$ at a wavelength $\lambda$ in the range of 380 to 780 nm of the i+1 th thermoplastic resin layer have a relationship in a formula [1]:

$$|n_i(\lambda)-n_{i+1}(\lambda)|\leq 0.05 \quad \text{Formula [1]}$$

where, i is an integer of 1 to k−1.

(2) The protective film for polarizing plate described in (1), in which an absolute value of a photoelastic coefficient is $10\times10^{-12}$ $Pa^{-1}$ or less.

(3) The protective film for polarizing plate comprising k layers (k is an integer of 2 or more) of thermoplastic resin laminated, in which every one of the thermoplastic resin layers is made of a material with haze of 0.5% or less and contain amorphous thermoplastic resin, and a humidity expansion coefficient $\beta_i$ of the i th thermoplastic resin layer and a humidity expansion coefficient $\beta_{i+1}$ of the i+1 th thermoplastic resin layer satisfy a relationship of a formula [2].

$$|\beta_i-\beta_{i+1}|\leq 40 \text{ ppm/\% RH} \quad \text{Formula [2]}$$

where, i is an integer of 1 to k−1.

(4) The protective film for polarizing plate described in (1), in which at least one layer is a thermoplastic resin layer with a water absorption coefficient of 0.5% or less.

(5) The protective film for polarizing plate described in (1), which is obtained by coextrusion.

(6) The protective film for polarizing plate described in (1), in which the pencil hardness is 4H or more.

(7) The protective film for polarizing plate described in (1), in which a hard-coat layer with a refractive index of 1.6 or more is further provided directly or indirectly on the surface of the k th thermoplastic resin layer.

(8) The protective film for polarizing plate described in (1), in which an antireflection layer is further provided directly or indirectly on the surface of the k th thermoplastic resin layer.

(9) The protective film for polarizing plate described in (1), in which the surface of the k th thermoplastic resin layer is a flat surface not having linear recess portion with the depth of 50 nm or more and the width of 500 nm or less and linear projection portion with the height of 50 nm or more and the width of 500 nm or less.

(10) A polarizing plate comprising a polarizer and the protective film for polarizing plate described in (1) laminated on at least one face of the polarizer.

(11) The polarizing plate described in (10), in which the polarizer contains polyvinyl alcohol, the protective film for polarizing plate is laminated with the first thermoplastic resin layer faced with the polarizer side, and a refractive index $n_l(\lambda)$ at a wavelength in the range of 380 to 780 nm of the first thermoplastic resin layer and a refractive index $n_b(\lambda)$ at a wavelength in the range of 380 to 780 nm of the polyvinyl alcohol satisfy a relationship in formula [3].

$$|n_l(\lambda)-n_b(\lambda)|\leq 0.05 \quad \text{Formula [3]}$$

(12) The polarizing plate described in (10), in which the polarizer contains polyvinyl alcohol, the protective film for polarizing plate is laminated with the first thermoplastic resin layer faced with the polarizer side, and a refractive index $n_l(380)$ at a wavelength 380 nm and a refractive index $n_l(780)$ at a wavelength 780 nm of the first thermoplastic resin layer and a refractive index $n_b(380)$ at a wavelength 380 nm and a refractive index $n_b(780)$ at a wavelength 780 nm of the polyvinyl alcohol satisfy a relationship in a formula [4].

$$||n_l(380)-n_b(380)|-|n_l(780)-n_b(780)||\leq 0.02 \quad \text{Formula [4]}$$

(13) A liquid crystal display comprising at least one polarizing plate described in (10) and a liquid crystal panel.

EFFECT OF THE INVENTION

As, a protective film for polarizing plate of the present invention has fewer occurrences of light interference such as interference fringes and of scratches by friction, lamination on a polarizer can give a polarizing plate which will not cause defective visibility.

In the protective film for polarizing plate of the present invention, a phase difference of the polarizing plate is hardly changed by stress due to heat or deformation, and a polarizing plate not having light leakage, uneven color, coloring or the like in the vicinity of an edge of a display screen can be obtained even if an undesirable and unexpected stress is applied. Also, the polarizer and the protective film are hardly separated from each other even in a severe environment.

The polarizing plate of the present invention has high contrast and no cords generated. Also, since the polarizing plate is excellent in flexibility and scratch resistance, visibility does not become defective.

The polarizing plate of the present invention is suitable particularly for a large-area liquid crystal display or the like.

EXPLANATION OF SYMBOL

Figure 1:
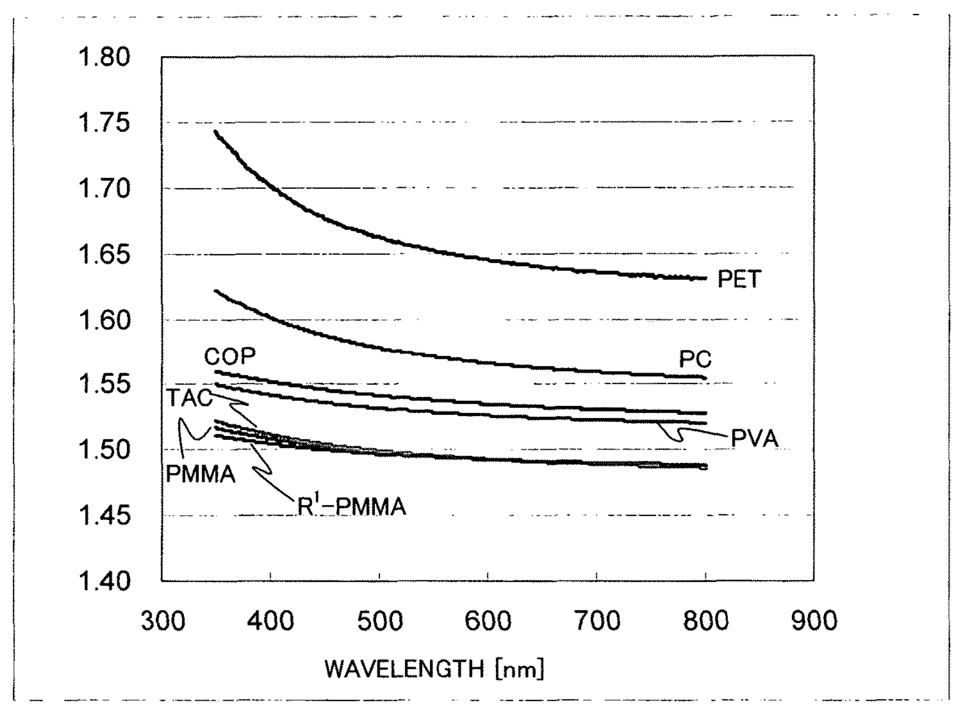
FIG. 1 is a diagram illustrating refractive index n(λ) of a thermoplastic resin layer used in Examples.

10: Polarizer; 20: Protective film for polarizing plate; 30: the second protective film for polarizing plate; 21, 22: Resin layer; 23: Adhesive layer; 40: Antireflection layer; PMMA: Polymethylmethacrylate resin; w COP: Alicyclic olefin polymer; TAC: Tri-acetyl cellulose, PC: Polycarbonate resin; PET: Polyethylene terephthalate resin

BEST MODE FOR CARRYING OUT THE INVENTION

A protective film for polarizing plate of the present invention comprises k layers (k is an integer of 2 or more) of thermoplastic resin laminated. That is, the protective film for polarizing plate comprises lamination of the first thermoplastic resin layer to the k th thermoplastic resin layer in this order.

The thermoplastic resin constituting the thermoplastic resin layer can be selected from polycarbonate resin, polyethersulphone resin, polyethylene terephthalate resin, polyimide resin, polymethylmethacrylate resin, polysulphone resin, poly arylate resin, polyethylene resin, polyvinyl chloride resin, cellulose diacetate, cellulose triacetate, alicyclic olefin polymer and the like.

Alicyclic olefin polymers include cyclic olefin random copolymer described in Japanese Patent Laid-open No. 05-310845, hydrogenated polymer described in Japanese Patent Laid-open No. 05-97978 and thermoplastic dicyclopentadiene ring-opening polymer and its hydrogenated products described in Japanese Patent Laid-open No.

11-124429. Not all the exemplified thermoplastic resins can be applied to the present invention, but even the same type of the thermoplastic resins include some satisfying the following requirements and others not, and those satisfying the following requirement should be selected.

The thermoplastic resins used in the present invention may be appropriately compounded with compounding agents including coloring agents such as pigment and dye, fluorescent brightening agent, dispersing agent, heat stabilizer, light stabilizer, ultraviolet absorber, antistatic agent, antioxidant, lubricant, solvent and the like.

As the lubricant, inorganic particles such as silicon dioxide, titanium dioxide, magnesium oxide, calcium carbonate, magnesium carbonate, barium sulfate and strontium sulfate as well as organic particles such as polymethylacrylate, polymethylmethacrylate, polyacrylonitrile, polystyrene, cellulose acetate, cellulose acetate propionate and the like can be mentioned. The organic particles are preferable as particles to constitute the lubricant, and particles made of polymethylmethacrylate are particularly preferable among them.

As the lubricant, elastic particles made of rubber-like elastic body may be used. The rubber-like elastic bodies include acrylic ester rubber-like polymer, rubber-like polymer with butadiene as its main component, ethylene-vinylacetate copolymer and the like. The acrylic ester rubber-like polymers include those with butyl acrylate, 2-ethylhexyl acrylate as its main component. Among them, acrylic ester rubber-like polymer with butyl acrylate as a main component and a rubber-like polymer with butadiene as its main component are preferable. The elastic particles may be two types of polymers in a layered state, which are represented by an elastic particle in which a grafted rubber elastic component layer of alkyl acrylate such as butyl acrylate and styrene and a hard resin layer made of a polymer of methylmethacrylate and/or a copolymer of methylmethacrylate and alkyl acrylate constitute a core-shell structure.

The elastic particle has a number average particle size of usually 2.0 μm or less, preferably 0.1 to 1.0 μm, or more preferably 0.1 to 0.5 μm in a state dispersed in the thermoplastic resin. Even if the principal particle size of the elastic particle is small, when the number average particle size of a secondary particle formed by aggregation or the like is large, the protective film for polarizing plate has a high haze and low light transmittance, which is not suitable for a display screen. However, if the number average particle size is too small, there is a tendency that flexibility is lowered.

In the present invention, refractive index $n_p(\lambda)$ at a wavelength 380 to 780 nm of the elastic particle and refractive index $n_r(\lambda)$ at a wavelength 380 to 780 nm of the thermoplastic resin to be matrix preferably satisfy a formula [5].

$$|n_p(\lambda)-n_r(\lambda)|\leq 0.05 \quad \text{Formula [5]}$$

Particularly, $|n_p(\lambda)-n_r(\lambda)|\leq 0.045$ is more preferable. $n_p(\lambda)$ and $n_r(\lambda)$ are average values of principal refractive indexes at the wavelength λ. If the value of $|n_p(\lambda)-n_r(\lambda)|$ exceeds the above value, there is a fear that transparency is lost due to interface reflection caused by refractive index difference on the interface.

The thermoplastic resin used in the present invention has light transmittance in a visible region of 400 to 700 nm in a 1-mm thickness of preferably 80% or more, more preferably 85% or more and further preferably 90% or more. The thermoplastic resin is preferably an amorphous resin from the viewpoint of transparency. Those with a glass transition temperature of 60 to 200° C. are preferable, and 100 to 180° C. is more preferable. The glass transition temperature can be measured by differential scanning calorimetry (DSC).

In the protective film for polarizing plate of the present invention, a refractive index $n_i(\lambda)$ at a wavelength λ in a range of 380 to 780 nm of the i th thermoplastic resin layer and a refractive index $n_{i+1}(\lambda)$ at a wavelength λ in a range of 380 to 780 nm of the i+1 th thermoplastic resin layer have a relationship in a formula [1].

$$|n_i(\lambda)-n_{i+1}(\lambda)|-\leq 0.05 \quad \text{Formula [1]}$$

However, i is an integer of 1 to k−1. Particularly, the protective film for polarizing plate more preferably satisfies the relationship of $|n_i(\lambda)-n_{i+1}(\lambda)|\leq 0.045$.

$n_i(\lambda)$ and $n_{i+1}(\lambda)$ are Average values of principal refractive indexes at the wavelength λ. If the value of $|n_i(\lambda)-n_{i+1}(\lambda)|$ exceeds the above value for a part or the whole of i=1 to k−1, there is a fear that interference fringes might occur on the surface of the protective film for polarizing plate due to interface reflection caused by refractive index difference on the interface. The i th thermoplastic resin layer and the i+1 th thermoplastic resin layer adjacent to each other may be in direct contact or in contact through an adhesive layer to be described.

The protective film for polarizing plate of the present invention preferably has an absolute value of the photoelastic coefficient at $10\times10^{-12}$ $Pa^{-1}$ or less.

The photoelastic coefficient is a value indicating stress dependence of birefringence generated when a stress is applied, and a difference Δn of the refractive indexes is determined by a product of a stress σ and the photoelastic coefficient C. The photoelastic coefficient can be measured by using a photoelastic coefficient measuring device under a condition of a temperature at 20±2° C. and a humidity of 60±5%. In the present invention, the absolute value of the photoelastic coefficient is preferably $7\times10^{-12}$ $Pa^{-1}$ or less, and more preferably $5\times10^{-12}$ $Pa^{-1}$ or less.

In the protective film for polarizing plate of the present invention, at least one layer of the laminated thermoplastic resin layers has a negative photoelastic coefficient, and at least another is preferably a thermoplastic resin layer having a positive photoelastic coefficient.

The thermoplastic resin layer having a negative photoelastic coefficient is a resin layer whose Δn becomes negative when a positive stress σ is applied. The thermoplastic resin layer having a positive photoelastic coefficient is a resin layer whose Δn becomes positive when a positive stress σ is applied. The thermoplastic resins constituting each thermoplastic resin layer are not particularly limited as long as the layer having the above coefficient can be formed, and the resin may be alone or a combination of two or more. The combination of two or more includes not only the combination of the thermoplastic resins having the photoelastic coefficient in the same sign but also the combination of the thermoplastic resin with the negative photoelastic coefficient and the thermoplastic resin with the positive photoelastic coefficient.

The thermoplastic resin having the negative photoelastic coefficient includes polymethylmethacrylate resin, polystyrene, poly-α-methylstyrene, ethylene-tetracyclododecene addition copolymer and the like.

The thermoplastic resin having the positive photoelastic coefficient includes polycarbonate resin, polysulphone resin, polyalirate resin, polyethersulphone resin, polyethyleneterephthalate resin, ring-opening polymers of norbornene structure-containing monomer such as tetracyclododecene and dicyclopentadiene and their hydrogenated products, and triacetyl cellulose and the like.

In the protective film for polarizing plate of the present invention, each of the thermoplastic resin layers is formed of a material with haze at 0.5% or less and includes an amorphous thermoplastic resin, and a humidity expansion coefficient $\beta_i$ of the i th thermoplastic resin layer and a humidity expansion coefficient $\beta_{i+1}$ of the i+1 th thermoplastic resin layer preferably satisfy the relationship in the formula [2].

$$|\beta_i-\beta_{i+1}|\leq 40 \text{ ppm/\% RH} \quad \text{Formula [2]}$$

In the protective film for polarizing plate of the present invention, since each thermoplastic resin is formed of a material with haze at 0.5% or less and includes an amorphous thermoplastic resin, and the relationship in the above formula [2] is satisfied, deformation is hard to occur and generation of a scratch by friction is less. Thus, a polarizing plate in which visibility does not become poor and the polarizer and the protective layer do not separate from each other even under a severe environment can be obtained.

Each of the thermoplastic resin layers is more preferably formed of a material with haze at 0.1% or less. The haze value can be determined as an arithmetic average value by measuring five flat plates with the thickness of 2 mm fabricated by a injection molding method using a molding die without projections or recesses on the surface in compliance with JIS (Japan Industrial Standards) K7105 by "Turbid meter NDH-300A" by Nippon Denshoku Industries, Co., Ltd.

The amorphous thermoplastic resin is a thermoplastic resin not having a melting point and can be selected from the above thermoplastic resins. A content of the amorphous thermoplastic resin is preferably 60 to 100 parts by weight in 100 parts by weight of the thermoplastic resin layer. The above formula [2] is more preferably $|\beta_i-\beta_{i+1}|\leq 30$ ppm/% RH.

In the protective film for polarizing plate of the present invention, water absorption coefficient of at least one layer in the laminated thermoplastic resin layers can be 0.5% or less, or further 0.1% or less. By using those with a lower water absorption coefficient for the protective film for polarizing plate, durability of the polarizing plate is improved. The water absorption coefficient of the thermoplastic resin layer can be determined in compliance with JIS K7209.

In the protective film for polarizing plate of the present invention, its in-plane retardation Re (a value defined by $Re=d\times(n_x-n_y)$, $n_x$ is a refractive index of an in-plane delay phase axis and $n_y$ is a refractive index in a direction perpendicular to the delay phase axis in the plane; d is an average thickness of the protective film for polarizing plate) is preferably smaller and specifically the in-plane retardation Re at the wavelength of 550 nm is preferably 50 nm or less, and more preferably 10 nm or less.

In the protective film for polarizing plate of the present invention, an absolute value of its retardation Rth in the film-thickness direction (a value defined by $Rth=d\times([n_x+n_y]/2-n_z)$; $n_x$ is a refractive index of an in-plane delay phase axis, $n_y$ is a refractive index in a direction perpendicular to the delay phase axis in the plane, and $n_z$ is a refractive index in the film thickness direction) is preferably smaller. Specifically, the retardation Rth in the film thickness direction of the protective film for polarizing plate is preferably −10 to +10 nm, and more preferably −5 nm to +5 nm at the wavelength of 550 nm.

The preferable protective film for polarizing plate of the present invention has at least one thermoplastic resin layer (hereinafter referred to as an "intermediate layer") between the k th thermoplastic resin layer and the first thermoplastic resin layer. The intermediate layer may be constructed by a thermoplastic resin of a type different from the thermoplastic resin forming the k th thermoplastic resin layer and the first thermoplastic resin layer or may be constructed by a thermoplastic resin of the same type.

The thermoplastic resin layer forming the protective film for polarizing plate of the present invention is not particularly limited by the respective thicknesses, but the thickness of the k th thermoplastic resin layer is usually 5 to 100 μm, preferably 10 μm or more, and more preferably 10 to 50 μm. The thickness of the first thermoplastic resin layer is usually 5 to 100 μm, and preferably 10 to 50 μm. At this time, the thickness of the k th thermoplastic resin layer and the thickness of the first thermoplastic resin layer are preferably substantially equal. Specifically, an absolute value in a difference between the thickness of the k th thermoplastic resin layer and the thickness of the first thermoplastic resin layer is preferably 20 μm or less, and more preferably 10 μm or less.

The thickness of the intermediate thermoplastic resin layer provided as necessary between the first thermoplastic resin layer and the k th thermoplastic resin layer is usually 5 to 100 μm, or preferably 10 to 50 μm. The ratio between the thickness of the intermediate thermoplastic resin layer and the thickness of the k th thermoplastic resin layer or the thickness of the first thermoplastic resin layer is not particularly limited but is preferably 5:1 to 1:5.

The thickness of the protective film for polarizing plate is usually 20 to 200 μm or preferably 40 to 100 μm.

The thermoplastic resin forming the first thermoplastic resin layer is preferably selected from acrylic resin, alicyclic olefin polymer, and polycarbonate resin, and the acrylic resins such as polymethylmethacrylate resin is particularly preferable.

The thermoplastic resin forming the k th thermoplastic resin layer is preferably hard. Specifically, pencil hardness (in compliance with JIS K 5600-5-4 except that a test load is 500 g) is preferably harder than 2H. The most preferable thermoplastic resin forming the k th thermoplastic resin layer is selected from the acrylic resins such as polymethylmethacrylate resin.

Also, when the polarizing plate is configured by providing the protective film for polarizing plate on the polarizer, in order to prevent warping, curving or rounding of the polarizing plate, the thermoplastic resin forming the k th thermoplastic resin layer and the thermoplastic resin forming the first thermoplastic resin layer are preferably selected from the same type of thermoplastic resin.

The laminated thermoplastic resin layers maybe in direct contact with each other or in contact through an adhesive layer. The adhesive layer preferably has an average thickness of usually 0.01 to 30 μm, or preferably 0.1 to 15 μm. The adhesive layer is a layer with a tensile breaking strength according to JIS K7113 of 40 MPa or less. The adhesive constituting the adhesive layer includes acrylic adhesive, urethane adhesive, polyester adhesive, polyvinyl alcohol adhesive, polyolefin adhesive, modified polyolefin adhesive, polyvinylalkylether adhesive, rubber adhesive, vinyl chloride-vinyl acetate adhesive, SEBS adhesive, ethylene adhesive such as ethylene-styrene copolymer, acrylic ester adhesive such as ethylene-methyl (meth)acrylate copolymer and ethylene-ethyl (meth)acrylate copolymer and the like.

The moisture permeability of the protective film for polarizing plate of the present invention is not particularly limited but is preferably 40 $g/(m^2\cdot 24\ h)$ or less, more preferably 10 $g/(m^2\cdot 24\ hr)$ or less. The moisture permeability can be measured with a test condition of being left in an environment of 40° C., 92% R.H. for 24 hours using a cup method according to JIS Z0208.

When the protective film for polarizing plate of the present invention has a tensile elastic modulus $A_i$ of the i th thermoplastic resin layer and a tensile elastic modulus $A_{i+1}$ of the i+1 th thermoplastic resin layer, $|A_{i+1}-A_i| \geq 0.5$ GPa for all the value of i. By having this configuration, strength and flexibility of the polarizing plate in which the protective film is provided can be improved while preventing degradation of optical performance due to interference fringes or the like. Tensile elastic modulus $A_k$ of the k th thermoplastic resin layer can be set at 3.0 GPa or more. Tensile elastic modulus $A_k$ of the k th thermoplastic resin layer can be set larger than the tensile elastic modulus $A_{k-1}$ of the k−1 th thermoplastic resin layer adjacent to that. Also, tensile elastic modulus $A_I$ of the first thermoplastic resin layer can be set at 3.0 GPa or more.

The total number of the laminated thermoplastic resin layers is preferably seven or less, and more preferably 5 or less. If the number is larger than this, there is a fear that control of surface condition or thickness in each layer becomes difficult.

It is preferable that the suitable polarizing plate of the present invention does not have a linear recess portion nor linear projection portion on the surface of the k th thermoplastic resin layer but the surface is a flat face. Even if the linear recess portion or linear projection portion is formed, a linear recess portion with depth of less than 50 nm or width of more than 500 nm, or a linear projection portion with height of less than 50 nm or width of more than 500 nm is preferable. A linear recess portion with depth of less than 30 nm or width of more than 700 nm or a linear projection portion with height of less than 30 nm or width of more than 700 nm is more preferable. Moreover, it is preferable that the linear projection portion or the linear recess portion as above is not provided on the surface of the first thermoplastic resin layer, either, similar to the k th thermoplastic resin layer. By not providing such a linear recess portion nor linear projection portion, light leakage or light interference can be prevented.

The depth of the linear recess portion, the height of the linear projection portion of the film and their widths are determined by a method described below. Light is irradiated to the protective film for polarizing plate, the transmitted light is projected to a screen, and a portion with a light-dark stripe of the light appearing on the screen (this portion is where the depth of the linear recess portion and the height of the linear projection portion are large) is cut out by a 30 mm square. The surface of the cut-out film piece is observed using a three-dimensional surface-structural analysis microscope (view region of 5 mm×7 mm), this is converted into a three-dimensional image, and a sectional profile in the MD direction is acquired from the three-dimensional image. The sectional profile is acquired in the view region with an interval of 1 mm. An average line is drawn on this sectional profile, and the length from the average line to the bottom of the linear recess portion is the linear recess portion depth, or the length from the average line to the top of the linear projection portion is the linear projection portion height. A distance between intersections with the average line and the profile is the width. Maximum values are acquired from measured values of the linear recess portion depth and linear projection portion height, respectively, and the width of the linear recess portion or linear projection portion indicating the maximum value is acquired, respectively. The maximum values of the linear recess portion depth and the liner projection portion height acquired as above and the linear recess portion width and the linear projection portion width indicating the maximum value are set as the depth of the linear recess portion, the height of the linear projection portion, and their widths of the film.

The thermoplastic resin layer not having the linear projection portion and the linear recess portion of the above size can be obtained by the following means: in the T-die extrusion molding, for example, the layer can be obtained by executing the means such as reduction of the surface roughness of a lip portion on the die, plating the lip tip end portion with chromium, nickel, titanium or the like, thermal spraying of ceramics to the lip tip end portion, forming a coat such as TiN, TiAlN, TiC, CrN, DLC (diamond like carbon) by PVD (Physical Vapor Deposition) on the inner surface of the lip, adjustment to even temperature distribution and air flow around a molten resin immediately after being extruded from the die, selection of a resin forming the thermoplastic resin layer with the same level of melt flow rate value and the like. In the cast molding, the layer can be obtained by carrying out means such as use of a cast support film with small surface roughness, reduction of the surface roughness of an applicator, or moreover adjustment of temperature distribution, drying temperature, drying time when drying an applied layer.

The protective film for polarizing plate of the present invention is not particularly limited by its manufacture but includes the one obtained by bonding single layered films of the thermoplastic resin together, the one obtained by coextrusion molding of a plurality of thermoplastic resins, the one obtained by casting thermoplastic resin solution onto a thermoplastic resin film or the like. Among them, the protective film for polarizing plate obtained by coextrusion molding is preferable from the viewpoint of productivity. In the case of the coextrusion, no complicated process (drying process or paint process, for example) is needed, and contamination of external foreign substances such as dust is fewer and a film with excellent optical characteristics can be provided, which is an advantage.

In the protective film for polarizing plate of the present invention may be provided with antiglare means.

The haze of the protective film for polarizing plate of the present invention with the antiglare means formed is preferably 5 to 60%, more preferably 10 to 50%. The haze can be measured by a turbid meter sold on the market such as NDH-300A haze meter by Nippon Denshoku Industries, Co., Ltd., for example.

A transmission image clarity of the protective film for polarizing plate of the present invention after formation of the antiglare means is approximately 50 to 100%, preferably 60 to 100% when an optical comb with a width of 0.5 mm is used. If the transmission image clarity is within the above range, blurring of transmitted light is less and blurring of pixel profile can be prevented even in a high-definition display and character blurring can be prevented as a result.

The transmission image clarity is a scale to quantify blurring and distortion of light transmitted through a film. The transmission image clarity is measured through an optical comb moving the transmitted light from the film, and a value is calculated by a light intensity of light and dark parts of the optical comb. That is, when the film blurs the transmitted light, an image of a slit formed on the optical comb becomes thick, and the light intensity at the transmission portion becomes 100% or less, while since light leaks at the non-transmission portion, the light intensity becomes 0% or more. The transmission image clarity C can be acquired by the following formula from a maximum intensity M of the transmitted light at a transparent portion in the optical comb and a transmitted light minimum intensity m of the transmitted light at a non-transparent portion.

$$C(\%)=[(M-m)/(M+m)]\times 100$$

The closer the value of C gets to 100%, the smaller blurring of the image is.

As a measuring device for measuring the transmission image clarity, an image clarity measuring device ICM-1 produced by Suga Test instruments Co., Ltd. can be used, for example. An optical comb with the width of 0.125 to 2 mm can be used.

In the present invention, both the transmission image clarity and haze after formation of the antiglare means are preferably within the above ranges.

The forming method of the antiglare means is not particularly limited but appropriate antiglare means can be employed. For example, they include a method of giving fine irregularity to the protective film for polarizing plate and a method of giving an antiglare function by internal scattering by forming a film layer including a region where the refractive index is discontinuous.

The method of giving fine irregularity is not particularly limited but appropriate methods can be employed. For example, they include a method of giving fine irregularity by roughing processing such as sand blast, emboss roll, chemical etching or the like directly on the protective film for polarizing plate or while another layer is laminated, a method of transferring irregularity by a shape-formed film, a method of dispersing inorganic and/or organic particulates in a resin constituting the protective film for polarizing plate, a method of forming an antiglare layer made of a transparent resin material containing inorganic and/or organic particulates on the protective film for polarizing plate and the like, and two types or more of them may be combined for use.

Two or more of the above particulates may be used. For example, particulates that exert dispersion effect by a difference in refractive index from the transparent resin material and particulates that exert dispersion effect by forming irregularity on the surface of the resin layer may be both used at the same time.

The above particulate may be present in the resin constituting the protective film for polarizing plate or in the transparent resin material in an evenly dispersed state or biased state with respect to the film thickness direction. Also, the particulate may be present projecting from the surface, but from the viewpoint of improvement in transmission image clarity, projection of the particulate from the surface of the antiglare layer is preferably 0.5 μm or less.

As a method of giving the antiglare function by internal scattering by forming a film layer including a region where the refractive index is discontinuous, there can be a method of forming a film layer having a phase-separation structure by ultraviolet irradiation or the like using two or more compositions with different refractive indexes and a method of forming a film layer containing a transparent resin material and a particulate having a refractive index different from that of the transparent resin material.

In the protective film for polarizing plate of the present invention, an antireflection layer is preferably provided on the surface of the k th thermoplastic resin layer directly or indirectly. The average thickness of the antireflection layer is preferably 0.01 to 1 μm, more preferably 0.02 to 0.5 μm. The antireflection layer can be selected from those known. For example, the one in which a low refractive-index layer with a refractive index smaller than that of the k th thermoplastic resin layer, preferably the refractive index 1.30 to 1.45, is laminated, the one in which a low refractive-index layer made of an inorganic compound and a high refractive-index layer made of an inorganic compound are alternately laminated, and the one in which the low refractive-index layer is laminated on the high refractive-index layer having a high surface hardness or the like can be cited.

The antireflection layer in which a low refractive-index layer formed by a material having a micro air hollow layer can be used as the low refractive-index layer. In the present invention, the one in which the low refractive-index layer formed by a material having a micro air hollow layer is laminated on the high refractive-index layer having a high surface hardness can be used. The protective film for polarizing plate on which the antireflection layer is laminated preferably has a reflectivity of 2.0% or less at 430 to 700 nm and a reflectivity of 1.0% or less at 550 nm in incident angle of 5°.

Color fluctuation represented by ΔEab* value of CIE1976 L*a*b* color space is preferably 2 or less at arbitrary two locations separated by 5 cm. The ΔEab* value is calculated by computing L* value, a* value, and b* value in the L*a*b* color space from reflection spectrum of specular reflection to a 5°-incident light of a CIE standard light source D65 in a region with the wavelength of 380 to 780 nm, by acquiring ΔL* value, Δa* value, and Δb* value as differences for the L* value, a* value, and b* value measured at the arbitrary two locations separated by 5 cm respectively, and by assigning them in a formula of $\Delta Eab^* = (\Delta L^{*2} + \Delta a^{*2} + \Delta b^{*2})^{1/2}$.

Then, the antireflection layer in which a low refractive-index layer formed by a material having a micro air hollow layer is laminated on a high refractive-index layer having a high surface hardness will be described. The antireflection layer in which a low refractive-index layer formed by a material having a micro air hollow layer is laminated on a high refractive-index layer having a high surface hardness is laminated with the low refractive-index layer faced with the visible side.

The layer formed by a material having a micro air hollow layer can be used as the low refractive-index layer of the present invention. The thickness of the low refractive-index layer is usually 10 to 1000 nm, preferably 30 to 500 nm. A material having the micro air hollow layer includes aero gel. The aero gel is a transparent porous body in which micro air cavities are dispersed in a matrix. The size of the air cavity is mainly 200 nm or less, and a content of the air cavity is usually 10 to 60 volume %, or preferably 20 to 40 volume %. The aero gel is classified into a silica aero gel and a porous body in which a hollow particulate is dispersed in a matrix.

The silica aero gel can be manufactured, as disclosed in U.S. Pat. Nos. 4,402,927, 4,432,956 and 4,610,863, by moistening a gel compound made of silica framework obtained by hydrolytic polymerization of alkoxysilane in a disperse medium such as alcohol or carbon dioxide and by supercritical drying the moistened to remove the medium. Also, silica aero gel can be manufactured similarly as the above with sodium silicate as a material as disclosed in U.S. Pat. Nos. 5,137,279 and 5,124,364.

In the present invention, as disclosed in Japanese Patent Laid-Open No. 5-279011 and Japanese Patent Laid-Open No. 7-138375 (U.S. Pat. No. 5,496,527), it is preferable to give a hydrophobic character to silica aero gel by hydrophobizing processing of a gel-state compound obtained by hydrolysis and polymerization of alkoxysilane. With this hydrophobic silica aero gel to which a hydrophobic character is given, moisture or water is hard to intrude and performances of silica aero gel such as refractive index and light transmittance can be prevented from being lowered.

A porous body in which a hollow particulate is dispersed in a matrix includes porous bodies as disclosed in Japanese patent Laid-Open No. 2001-233611 and Japanese Patent Laid-Open No. 2003-149642. The porous body in which the hollow particulate is dispersed in the matrix shall not be included in the thermoplastic resin layer.

The material used in the matrix is selected from materials satisfying conditions such as dispersibility of the hollow particulate, transparency of the porous body, strength of the porous body and the like. For example, polyester resin, acrylic resin, urethane resin, vinyl chloride resin, epoxy resin, melamine resin, fluorine resin, silicone resin, butyral resin, phenol resin, vinyl acetate resin, hydrolyzable organic silicon compounds such as alkoxysilane and their hydrolysates and the like can be mentioned. Among them, from the viewpoint of dispersibility of the hollow particulate and strength of the porous body, acrylic resin, epoxy resin, urethane resin, silicone resin hydrolyzable organic silicon compounds and their hydrolysates are preferable.

The hollow particulate is not particularly limited but inorganic hollow particulates are preferable and silica hollow particulates are particularly preferable. Inorganic compounds constituting the inorganic hollow particulate include $SiO_2$, $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, $TiO_2$—$Al_2O_3$, $TiO_2$—$ZrO_2$, $In_2O_3$—$SnO_2$, $Sb_2O_3$—$SnO_2$ and the like. The above sign "—" represents a composite oxide.

The outer shell of the hollow particulate may be porous having fine pores or may be such that the fine pores are blocked and the cavity is sealed against the outside of the outer shell. The outer shell is preferably in a multi-layered structure made of an inner layer and an outer layer. When a fluorine-containing organic silicon compound is used for forming the outer layer, the refractive index of the hollow particulate is lowered, dispersibility to the matrix is improved, and moreover, an advantage to apply antifouling property to the low refractive-index layer is obtained. Specific examples of fluorine-containing organic silicon compound include 3,3,3-trifluoropropyltrimethoxysilane, methyl-3,3,3-trifluoro-propyldimethoxysilane, heptadeca-fluoro-decylmethyldimethoxysilane, heptadeca-fluoro-decyltrichlorosilane, heptadeca-fluoro-decyltrimethoxysilane, trideca-fluoro-octyltrimethoxysilane, and the like.

The thickness of the outer shell is usually 1 to 50 nm, or preferably 5 to 20 nm. Also, the thickness of the outer shell is preferably within the range of 1/50 to 1/5 of an average particle size of the inorganic hollow particulate.

In the cavity, a medium used when preparing the hollow particulate and/or a gas which intrudes during drying may be present or a precursor substance for forming the cavity may remain in the cavity.

The average particle size of the hollow particulate is not particularly limited but the range of 5 to 2,000 nm is preferable and 20 to 100 nm is more preferable. The average particle size is number average particle size by microscope observation by transmission electron microscope.

In the present invention, the high refractive-index layer having a high surface hardness can be also used as the k th thermoplastic resin layer, or as a layer different from the k th thermoplastic resin layer (this layer provided separately is referred to as a "hard-coat layer" in some cases) may be provided on the surface of the k th thermoplastic resin layer. The thickness of the high refractive-index layer is preferably 0.5 to 30 μm, or more preferably 3 to 15 μm. The refractive index of the high refractive-index layer is preferably 1.6 or more.

The high refractive-index layer (or hard-coat layer) is formed of a thermosetting or light-setting material showing a hardness of "H" or harder by a pencil hardness test (a test plate is a glass plate and a test load is changed to 500 g) measured in compliance with JIS K5600-5-4. The pencil hardness of the protective film for polarizing plate on which such a hard-coat layer is provided is preferably 4H or harder. The materials for hard-coat layer include organic hard-coat materials such as organic silicone hard-coat materials, melamine hard-coat materials, epoxy hard-coat materials, acrylic hard-coat materials, and urethane acrylate hard-coat materials; and inorganic hard-coat materials such as silicon dioxide. Among them, from the viewpoint of favorable adhesion and excellent productivity, use of urethane acrylate hard-coat materials and multifunctional acrylate hard-coat materials are preferable.

In the high refractive-index layer, its refractive index $n_H$ preferably has relationships of $n_H \geq 1.53$ and $n_H^{1/2}-0.2<n_L<n_H^{1/2}+0.2$ with the refractive index $n_L$ of the low refractive-index layer to be laminated thereon.

The high refractive-index layer may contain various fillers with the purpose of adjustment of refractive index, improvement of bending elastic modulus, stabilization of volume shrinkage factor, enhancement of heat resistance, antistatic property, antiglare property and the like. Moreover, various additives may be compounded such as antioxidant, ultraviolet absorber, light stabilizer, antistatic agent, leveling agent, antifoaming agent and the like.

Fillers for adjusting refractive index and antistatic property of the high refractive-index layer include titanium oxide, zirconium oxide, zinc oxide, tin oxide, cerium oxide, antimony pentoxide, indium oxide doped with tin (ITO), tin oxide doped with antimony (IZO), zinc oxide doped with aluminum (AZO), and tin oxide doped with fluorine (FTO). From the viewpoint that transparency can be maintained, antimony pentoxide, ITO, IZO, ATO, and FTO are mentioned as suitable fillers. The primary particle diameter of these fillers is usually 1 nm or more and 100 nm or less, or preferably 1 nm or more and 30 nm or less.

As a filler to apply antiglare property, those with the average particle size of 0.5 to 10 μm is preferable, 1.0 to 7.0 μm is more preferable, and 1.0 to 4.0 μm is further preferable. Specific examples of the filler to apply antiglare property includes fillers made from organic resins such as polymethylmethacrylate resin, vinylidene fluoride resin and other fluorine resins, silicone resin, epoxy resin, nylon resin, polystyrene resin, phenol resin, polyurethane resin, cross-linked acrylic resin, cross-linked polystyrene resin, melamine resin, benzoguanamine resin and the like; or fillers made from inorganic compounds such as titanium oxide, aluminum oxide, indium oxide, zinc oxide, antimony oxide, tin oxide, zirconium oxide, ITO, magnesium fluoride, silicon oxide and the like.

In the protective film for polarizing plate of the present invention, in order to improve antifouling property of the low refractive-index layer, an antifouling layer may be further provided on the side of observation of the low refractive-index layer. The antifouling layer is a layer that can impart water repellency, oil repellency, perspiration resistance, antifouling property or the like to the surface of the protective film for polarizing plate. As a material used for forming the antifouling layer, a fluorine-containing organic compound is suitable. The fluorine-containing organic compounds include fluorocarbon, perfluorosilane or their high molecular compounds. Methods of forming an antifouling layer include physical vapor deposition such as deposition and sputtering; chemical vapor deposition; wet coating method and the like. The average thickness of the antifouling layer is preferably 1 to 50 nm, or more preferably 3 to 35 nm.

Also, in the protective film for polarizing plate of the present invention, other layers including a gas barrier layer, a transparent antistatic layer, a primary layer, an electromagnetic shielding layer, an undercoat layer and the like may be provided.

The polarizing plate of the present invention can be formed by laminating the protective film for polarizing plate of the present invention and a polarizer. That is, the polarizing plate of the present invention may be in a mode where the protective film for polarizing plate is provided on both faces of the polarizer or in a mode where the protective film for polarizing plate is provided on only one face of the polarizer.

The polarizer used in the present invention is a known polarizer used in a liquid crystal display or the like. For example, a polarizer obtained by having iodine or diachronic dye adsorbed to a polyvinyl alcohol film and then uniaxially drawn in a boric-acid solution, or the one obtained by having iodine or diachronic dye adsorbed to a polyvinyl alcohol film and drawn and moreover a part of a polyvinyl alcohol unit in a molecular chain is modified to a polyvinylene unit can be cited. In addition, there is a polarizer having a function to isolate polarized light to a reflected light and transmitted light, such as grid polarizer, multi-layer polarizer, and cholesteric liquid-crystal polarizer. Among them, a polarizer containing polyvinyl alcohol is preferable.

When natural light is made to enter the polarizer used in the present invention, only one polarized light is transmitted. The polarization degree of the polarizer used in the present invention is not particularly limited, but it is preferably 98% or more, or more preferably 99% or more. The average thickness of the polarizer is preferably 5 to 80 μm.

The preferable polarizing plate of the present invention has the protective film for polarizing plate laminated with the first thermoplastic resin layer faced with the polarizer side, and a refractive index $n_l(\lambda)$ at a wavelength in the range of 380 to 780 nm of the first thermoplastic resin layer and a refractive index $n_b(\lambda)$ at a wavelength in the range of 380 to 780 nm of the polyvinyl alcohol satisfy a relationship in a formula [3].

$$|n_l(\lambda)-n_b(\lambda)|\leq 0.05 \quad \text{Formula [3]}$$

Also, the preferable polarizing plate of the present invention has the protective film for polarizing plate laminated with the first thermoplastic resin layer faced with the polarizer side, and a refractive index $n_l(380)$ at a wavelength 380 nm and a refractive index $n_l(780)$ at a wavelength 780 nm of the first thermoplastic resin layer as well as a refractive index $n_b(380)$ at a wavelength 380 nm and a refractive index $n_b(780)$ at a wavelength 780 nm of the polyvinyl alcohol to be contained in the polarizer satisfy a relationship in a formula [4].

$$||n_l(380)-n_b(380)|-|n_l(780)-n_b(780)||\leq 0.02 \quad \text{Formula [4]}$$

That is, a difference between the refractive index of the first thermoplastic resin layer and the refractive index of polyvinyl alcohol contained in the polarizer at a wavelength close to the upper limit of a visible light region is not so much different from the difference at a wavelength close to the lower limit of a visible light region. Particularly, $||n_l(380)-n_b(380)|-|n_l(780)-n_b(780)||\leq 0.01$ is preferable. $n_l(380)$ and $n_l(780)$ are average values of principal refractive indexes at the respective wavelengths. $n_b(380)$ and $n_b(780)$ are principal refractive indexes of non-oriented polyvinyl alcohol.

A liquid crystal display of the present invention comprises at least one of the polarizing plate of the present invention and a liquid crystal panel. The liquid crystal panel is not particularly limited as long as it is used in a liquid crystal display. For example, TN (Twisted Nematic) liquid crystal panel, STN (Super Twisted Nematic) liquid crystal panel, HAN (Hybrid Alignment Nematic) liquid crystal panel, IPS (In Plane Switching) liquid crystal panel, VA (Vertical Alignment) liquid crystal panel, MVA (Multiple Vertical Alignment liquid crystal panel, OCB (Optical Compensated Bend) liquid crystal panel and the like can be mentioned.

The preferable liquid crystal display of the present invention has the polarizing plate provided on the visible side of the liquid crystal panel. In the liquid crystal display, usually two polarizing plates are provided so as to hold the liquid crystal panel between them. The visible side of the liquid crystal panel is the side that an observer can visually recognize the display screen. The polarizing plate of the present invention, particularly the polarizing plate with the protective film for polarizing plate laminated on the visible side, has excellent visibility and it is preferably arranged on the visible side of the liquid crystal panel.

The polarizing plate of the present invention may be configured by laminating the above protective film for polarizing plate which is first protective film for polarizing plate on one face of the polarizer and by laminating a second protective film for polarizing plate, which will be described later, on the another face of the polarizer.

The second protective film for polarizing plate preferably has biaxiality and retardation Rth in the thickness direction of 70 to 400 nm. Retardation Rth in the thickness direction is, as mentioned above, a value indicated by $Rth=([n_x+n_y]/2-n_z)\times d$. Also, the biaxial film is a film satisfying $n_x>n_y>n_z$. When such a polarizing plate is used in a liquid crystal display, it can be suitably used in a liquid crystal panel in the vertical alignment (VA) mode.

When two of the polarizing plates in which the second protective film for polarizing plate is provided are used in the liquid crystal display, Rth of the second protective film for polarizing plate is preferably 50 to 250 nm, while one of the polarizing plates is used in the liquid crystal display, Rth of the second protective film for polarizing plate is preferably 100 to 400 nm.

As the second protective film for polarizing plate, the one obtained by drawing a film containing a thermoplastic resin, the one in which an optical anisotropic layer is formed on an undrawn thermoplastic resin film, and the one obtained by forming an optical anisotropic layer on a film containing a thermoplastic resin and then drawing it can be used. The drawn film may be in a single-layer form or a plural-laminated form.

In the film containing thermoplastic resin used in the second protective film for polarizing plate, those cited for the protective film for polarizing plate can be used as the thermoplastic resin. Among them, alicyclic olefin polymer and cellulose ester are preferable since they are excellent in transparency, low birefringence, dimensional stability and the like.

Cellulose ester being 2.5 to 2.9 in substitution degree of acyl group acquired conforming to ASTM D-817-96 can be preferably used. The acyl group includes acetyl group, propionyl group, and butyryl group. In the present invention, those mixed with cellulose ester with different substituent group such as cellulose acetate propionate can be also preferably used, and among them, the cellulose ester containing the acetyl group and propionyl group satisfying the following formula, where the substitution degree of acetyl group is A and the substitution degree of propionyl group is B:

$$2.5<(A+B)<2.9 \quad (1)$$

$$1.5<A<2.9 \quad (2)$$

A retardation increasing agent can be added to the thermoplastic resin according to need. The retardation increasing agent refers to a compound which increases retardation when being added to the thermoplastic resin as compared with the case of no addition. When the retardation increasing agent is to be added to cellulose ester, it is preferably used in the range of 0.01 to 20 parts by mass with respect to 100 parts by mass of cellulose acetate, use in the range of 0.1 to 10 parts by mass is more preferable, use in the range of 0.2 to 5 parts by mass is further preferable, and use in the range of 0.5 to 2 parts by mass is the most preferable. Two or more of retardation increasing agents may be used at the same time. The retardation increasing agent preferably has the maximum absorption in a wavelength region of 250 to 400 nm. The retardation increasing agent preferably does not have substantial absorption in the visible region.

As the retardation increasing agent, a compound having at least two aromatic rings is preferably used. In this specification, the "aromatic ring" includes aromatic heterocycle in addition to aromatic hydrocarbon ring. The aromatic hydrocarbon ring is particularly preferably 6-membered ring (that is, benzene ring). The aromatic heterocycle is generally unsaturated heterocycle. The aromatic heterocycle is preferably 5-membered, 6-membered, or 7-membered, more preferably 5-membered ring or 6-membered ring. The aromatic heterocycle generally has the most double bonds. As a heteroatom, nitrogen atom, oxygen atom and sulfur atom are preferable, and nitrogen atom is particularly preferable. Examples of aromatic hetero cycle includes furan ring, thiophen ring, pyrrole ring, oxazole ring, isoxazole ring, thiazole ring, isothiazole ring, imidazole ring, pyrazole ring, furazan ring, triazole ring, pyran ring, pyridine ring, pyridazine ring pyrimidine ring, pyrazine ring, and 1,3,5-triazine ring. As the aromatic ring, benzene ring, furan ring, thiophen ring, pyrrole ring, oxazole ring, thiazole ring, imidazole ring, triazole ring, pyridine ring, pyrimidine ring, pyrazine ring, and 1,3,5-triazine ring are preferable.

The number of aromatic rings in the retardation increasing agent is preferably 2 to 20, more preferably 2 to 12, further preferably 2 to 8 and the most preferably 2 to 6. The bond between two aromatic rings can be classified into: (a) when a condensed ring is formed; (b) when being directly bonded with single bond; and (c) when being bonded through a linking group (spirobond can not be formed since it is aromatic ring). The bond may be any one of (a) to (c).

Methods of drawing a film containing the thermoplastic resin include: a uniaxial drawing method such as uniaxial drawing in a transverse direction using a tenter; a biaxial drawing method such as simultaneous biaxial drawing method of stretching in the transverse direction by an expanding angle of a guide rail at the same time as stretching in the machine direction when an interval between fixing lips is expanded and sequential biaxial drawing method of stretching in the transverse direction using a difference in peripheral velocity between rolls and then stretching in the machine direction by clip-grasping the both ends and using a tenter; and a method of drawing diagonally using a tenting drawing machine set so that a feeding force, a tensile force or drawing force can be applied with velocities different between machine direction and transverse direction or right direction and left direction or so that a feeding force, a tensile force or drawing force can be applied with the same speeds in the machine and transverse directions or right and left directions and an stretching angle θ can be fixed with the traveling distance set at the same, or the traveling distance is made different. With any of the above methods, it is only necessary that the second protective film for polarizing plate satisfies the relationship of $n_x>n_y>n_z$ after the film containing the thermoplastic resin is drawn.

As for a drawing temperature, when a material forming the second protective film for polarizing plate or a resin with the lowest glass transition temperature in resins is Tg, the drawing can be carried out usually in the range of Tg to Tg+20° C. An drawing magnification may be adjusted in the range of usually 1.1 to 3.0 times in order to obtain a desired optical property.

The second protective film satisfies $n_x>n_y>n_z$, where $n_x$ is a refractive index of an in-plane delay phase axis, $n_y$ is a refractive index in a direction perpendicular to the delay phase axis in the plane, and $n_z$ is a refractive index in the thickness direction, with respect to the wavelength of 550 nm. If $n_x>n_y>n_z$ is not satisfied, when the polarizing plate on which the second protective film for polarizing plate is laminated is used in a liquid crystal display, screen contrast of the liquid crystal display is lowered and the screen is colored, which extremely deteriorates visibility of the screen. Thus, pass at standard inspection of the second protective film for polarizing plate is lowered and the total manufacturing efficiency of the liquid crystal display is deteriorated.

Polymer compounds and liquid crystalline compounds may be used for forming the optical anisotropic layer. They may be used singularly or together.

The polymer compounds include polyamide, polyimide, polyester, polyether ketone and the like. Specifically, compounds described in National Publication of International Patent Application No. 8-511812 (International Publication No. WO94/24191), National Publication of International Patent Application No. 2000-511296 (International Publication No. WO97/44704) and the like.

The liquid crystalline compounds may be rod-like liquid crystal or discotic liquid crystal or they include high-molecular liquid crystal, low-molecular liquid crystal or those cross-linked with low-molecular liquid crystal and no longer indicating liquid crystallinity. Suitable examples of the rod-like liquid crystal include the one described in Japanese Patent Laid-Open No. 2000-304932. Suitable examples of the discotic liquid crystal include the one described in Japanese patent Laid-Open No. 8-50206.

The optical anisotropic layer can be generally obtained by applying a solution in which a discotic compound and other compounds such as plasticizer, surfactant, polymer and the like are dissolved in a solvent on an oriented film, drying it, and then heating it to a temperature to form a discotic nematic phase and then, cooling while maintaining the oriented state—discotic nematic phase. Alternatively, the optical anisotropic layer can be obtained by applying a solution in which a discotic compound and other compounds such as polymerizable monomer, optical polymeric initiator and the like on an oriented film, drying it, heating it to a temperature to form a discotic nematic phase, polymerizing it by irradiation of an UV ray and the like and then further cooling it.

The thickness of the optical anisotropic layer is preferably 0.1 to 10 μm, more preferably 0.5 to 5 μm, or the most preferably 0.7 to 5 μm. However, depending on the mode of a liquid crystal cell, the thickness might be increased (3 to 10 μm) in order to obtain high optical anisotropy. The manufacturing method of the second protective film for polarizing plate containing the optical anisotropic layer is not particularly limited, and the second protective film is obtained by coating the polymer compound and/or liquid crystalline compound on a film containing thermoplastic resin to give coating film and then having the coating film drawn or contracted, for example.

EXAMPLES

Examples and comparative examples will be shown below in order to describe the present invention more specifically, but the present invention is not limited to the following embodiments but includes a case of four or more thermoplastic resin layers or a case of two layers, for example. Also, part and % are weight standard unless specifically noted.

(Preparation of Composition for Forming High Refractive-Index Layer (Hard-Coat Layer))

By a homogenizer, 30 parts of 6 functional urethane acrylate oligomer, 40 parts of butyl acrylate, 30 parts of isoboronyl methacrylate, and 10 parts of 2,2-diphenylethane-1-one were mixed, and 40%-methyl isobutyl ketone dispersion of antimony pentoxide particulate (average particle size of 20 nm, one hydroxyl group was bound to an antimony atom appearing on the surface of the pyrochlore structure) was mixed in a proportion that the weight of the antimony pentoxide particulate occupies 50 weight % of the whole solid content in the composition for forming the high refractive-index layer so as to prepare the composition H for forming high refractive-index layer.

(Preparation of Composition for Forming Low Refractive-Index Layer)

So as to obtain silicon resin with the weight average molecular weight of 850, 21 parts of tetramethoxysilane oligomer, 36 parts of methanol, 2 parts of water, and 2 parts of 0.01N hydrochloric aqueous solution were mixed and agitated in a high-temperature bath at 25° C. for 2 hours. Next, sol of the hollow silica particulate dispersed in isopropanol (solid content of 20%, average principal particle size of approximately 35 nm, outer shall thickness of approximately 8 nm) was added to the silicon resin so that the hollow silica particulate/silicon resin (condensation compound equivalent) to the solid content base was 8:2 in a weight ratio. Finally, the composition L for forming low refractive-index layer was prepared through dilution by methanol so that the entire solid content becomes 1%.

(Fabrication of Polarizer)

Polyvinyl alcohol (PVA) film with the thickness of 75 μm and the refractive index at the wavelength 380 nm of 1.545 as well as the refractive index at the wavelength 780 nm of 1.521 was uniaxially drawn to 2.5 times, immersed in a solution at 30° C. containing 0.2 g/L of iodine and 60 g/L of potassium iodide for 240 seconds, and then, immersed in a solution containing 70 g/L of boric acid and 30 g/L of potassium iodide and uniaxially drawn to 6.0 times at a time, and held for 5 minutes. Finally, it was dried at a room temperature for 24 hours to obtain a polarizer P with the average thickness of 30 μm and polarization degree of 99.95%.

Example 1

(Fabrication of Protective Film for Polarizing Plate)

Polymethylmethacrylate resin (Abbreviated as "PMMA". Water absorption coefficient of 0.3%, photoelastic coefficient of $-6.0\times10^{-12}$ $Pa^{-1}$, haze of 0.08%, humidity expansion coefficient of 28 ppm/% RH, tensile elastic modulus of 3.3 GPa.) was inputted to a double-flight type uniaxial extruder with a leaf-disk shaped polymer filter with an opening of 10 μm installed, and a molten resin was supplied to one of multi-manifold die with a die lip having surface roughness Ra of 0.1 μm at an extruder outlet temperature of 260° C.

On the other hand, an alicyclic olefin polymer (hydrogenated product of ring-opening polymer of a norbornene monomer, abbreviated as "COP". water absorption coefficient of less than 0.01%, photoelastic coefficient of $6.3\times10^{-12}$ $Pa^{-1}$, haze of 0.02%, humidity expansion coefficient of less than 1 ppm/% RH, tensile elastic modulus of 2.4 GPa.) was inputted to a double-flight type uniaxial extruder with a leaf-disk shaped polymer filter with an opening of 10 μm installed, and a molten resin was supplied to one of multi-manifold die with a die lip having surface roughness Ra of 0.1 μm at an extruder outlet temperature of 260° C.

And the polymethylmethacrylate resin in the molten state, alicyclic olefin polymer in the molten state, and ethylene-vinyl acetate copolymer as an adhesive in the molten state were respectively discharged from the multi-manifold die at 260° C. and cast to a cooling roll whose temperature was adjusted to 130° C., and then, passed between the cooling rolls at a temperature adjusted to 50° C. so as to obtain a protective film 1A for polarizing plate with the width of 600 mm and the thickness of 80 μm in a three-layers structure of the PMMA layer (20 μm)–adhesive layer (4 μm)–COP layer (32 μm)–adhesive layer (4 μm)–PMMA layer (20 μm) by coextrusion molding. The protective film 1A for polarizing plate had moisture permeability of 3.5 g/($m^2$·24 h), photoelastic coefficient of $1\times10^{-12}$ $Pa^{-1}$, and a difference in humidity expansion coefficient between adjacent layers at 27 ppm/% RH, and its surface was a flat face without linear recess portion or linear projection portion. The polymethylmethacrylate resin layer had distribution of refractive index n(λ) as shown in FIG. 1, and alicyclic olefin polymer layer had distribution of refractive index n(λ) as shown in FIG. 1. The polymethylmethacrylate resin layers had refractive index at the wavelength 380 nm of 1.512 and refractive index at the wavelength of 780 nm of 1.488, while the alicyclic olefin polymer layer had refractive index at the wavelength 380 nm of 1.555 and refractive index at the wavelength of 780 nm of 1.529.

(Fabrication of Polarizing Plate)

On one face of a lengthy undrawn film with the thickness of 100 μm made of alicyclic olefin polymer (glass transition temperature of 136° C.), corona discharge processing was applied using a high-frequency transmitter (by Kasuga Electric Works Co., Ltd., High-frequency power source AGI-024, output of 0.8 KW) so as to have a film 1B with surface tension of 0.055 N/m.

An acrylic adhesive was applied to both faces of the polarizer P, and one face of the protective film 1A for polarizing plate and the corona-discharge processed face of the film 1B were faced with the polarizer P, and stacked and bonded by a roll-to-roll method so as to obtain a polarizing plate 1.

Figure 2:
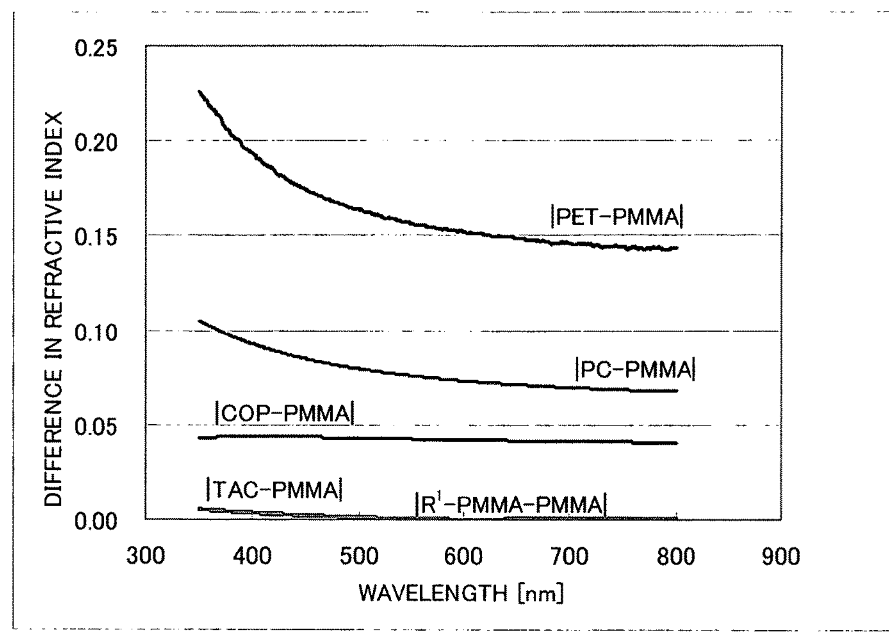
FIG. 2 is a diagram illustrating distribution of absolute values of differences between refractive indexes n(λ) of the thermoplastic resin layers used in Examples.
Figure 3:
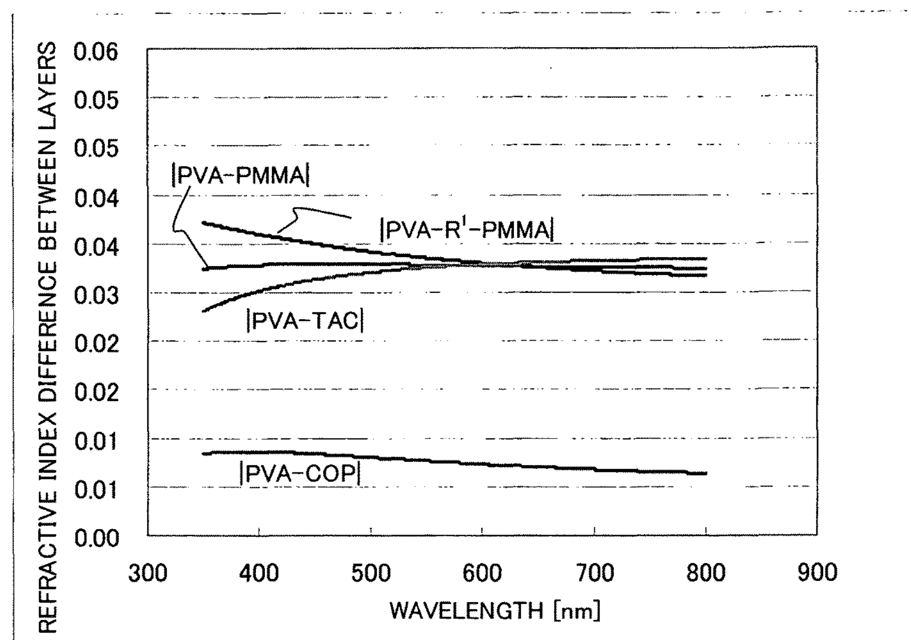
FIG. 3 is a diagram illustrating distribution of absolute values of differences between refractive index n(λ) of a polyvinyl alcohol and refractive index n(λ) of a thermoplastic resin layer used in Examples.

FIG. 2 shows distribution of absolute values of a difference between the refractive index n(λ) of the polymethylmethacrylate resin layer and the refractive index n(λ) of the alicyclic olefin polymer layer. The polymethylmethacrylate resin layer and the alicyclic olefin polymer layer satisfied the relationship in the formula [1]. As shown in FIG. 3, polyvinyl alcohol contained in the polarizer and polymethylmethacrylate resin layer satisfied the relationship in the formula [3]. Evaluation results are shown in Table 1 and Table 2.

Example 2

On one face of a triacetyl cellulose film with the thickness of 80 μm, 25 mL/$m^2$ of 1.5 mol/L isopropylalcohol solution of potassium hydroxide was applied and dried at 25° C. for 5 seconds. Then, it was washed by running water for 10 seconds and the surface of the film was dried by blowing air of 25° C. at the end to obtain a film 2B in which only one face of the triacetyl cellulose film was saponified.

An acrylic adhesive was applied on one face of the protective film 1A for polarizing plate, while a polyvinyl alcohol adhesive was applied on the saponified face of the film 2B, and the protective film 1A for polarizing plate, the polarizer P and the film 2B were stacked in this order and bonded with the adhesive by the roll-to-roll method so as to obtain a polarizing plate 2. Evaluation results are shown in Table 1 and Table 2.

Example 3

On both faces of the triacetyl cellulose film (abbreviated as "TAC") with the thickness of 40 μm having water absorption coefficient of 4.4%, photoelastic coefficient of $12\times10^{-12}$ $Pa^{-1}$, haze of 0.05%, and humidity expansion coefficient of 65 pm/% RH, 25 mL/$m^2$ of 1.5 mol/L isopropylalcohol solution of potassium hydroxide was applied and dried at 25° C. for 5 seconds. Then, it was washed by running water for 10 seconds and the surface of the film was dried by blowing air of 25° C. On both faces of the surface-treated triacetyl cellulose film, a single-layer film of polymethylmethacrylate resin having thickness of 30 μm was laminated by heat-pressed lamination so as to have a protective film 2A for polarizing plate. The protective film 2A for polarizing plate had moisture permeability of 61 g/($m^2$·24 h), photoelastic coefficient of $3\times10^{-12}$ $Pa^{-1}$, and a difference in humidity expansion coefficient between adjacent layers of 37 ppm/% RH, and its surface was a flat face without linear recess portion or linear projection portion. The triacetyl cellulose layer had distribution of the refractive index n(λ) as shown in FIG. 1, and every one of the polymethylmethacrylate resin layers had distribution of the refractive index n(λ) as shown in FIG. 1. The polymethylmethacrylate resin layers had the refractive index at the wavelength 380 nm of 1.512 and the refractive index at the wavelength of 780 nm of 1.488.

An acrylic adhesive was applied onto the both faces of the polarizer P, and one face of the protective film 2A for polarizing plate and the corona-discharge processed face of the film 1B were faced with the polarizer P and stacked and bonded by a roll-to-roll method so as to obtain a polarizing plate 3.

FIG. 2 shows distribution of absolute values of a difference between the refractive index n(λ) of the polymethylmethacrylate resin layer and the refractive index n(λ) of the triacetyl cellulose layer. The polymethylmethacrylate resin layer and the triacetyl cellulose layer satisfied the relationship in the formula [2]. Also, as shown in FIG. 3, polyvinyl alcohol contained in the polarizer and polymethylmethacrylate resin layer satisfied the relationship in the formula [3]. Evaluation results are shown in Table 1 and Table 2.

Example 4

(Production of Antireflection Layer)

On both faces of the protective film 1A for polarizing plate, corona discharge processing was applied using a high-frequency transmitter (output of 0.8 KW) so as to have a protective film 1C for polarizing plate with surface tension of 0.055 N/m.

Next, a composition H for forming a high refractive-index layer was applied on one face of the protective film 1A for polarizing plate using a die coater and it was dried in a drying furnace at 80° C. for 5 minutes so as to have a film. Moreover, ultraviolet was irradiated (integrated ultraviolet level of 300 mJ/$cm^2$) and a high refractive-index layer with the thickness of 5 μm was formed so as to have a laminated film 1D. The refractive index of the high refractive-index layer was 1.62 and the pencil hardness was 4H.

On the high refractive-index layer side of the laminated film 1D, a composition L for forming a low refractive-index layer was applied using a wire bar coater and left to be dried for 1 hour, and the obtained film was heat-treated under an oxygen atmosphere at 120° C. for 10 minutes to form a low refractive-index layer with the thickness of 100 nm (refractive index of 1.36), and a protective film 1E for polarizing plate with antireflection layer was obtained.

An acrylic adhesive was applied onto both faces of the polarizer P, and a face of the protective film 1E for polarizing plate without the antireflection layer and the corona-discharge processed face of the film 1B were faced with the polarizer P, and stacked and bonded by a roll-to-roll method so as to obtain a polarizing plate 4. Evaluation results are shown in Table 1 and Table 2.

Example 5

Polymethylmethacrylate resin (water absorption coefficient of 0.3%, photoelastic coefficient of $-6.0\times10^{-12}$ $Pa^{-1}$, haze of 0.08%, humidity expansion coefficient of 28 ppm/% RH, tensile elastic modulus of 3.3 GPa. Abbreviated as "PMMA") was inputted to a double-flight type uniaxial extruder with a leaf-disk shaped polymer filter with an opening of 10 μm, and a molten resin was supplied to one of multi-manifold die with a die lip having surface roughness Ra of 0.1 μm at an extruder outlet temperature of 260° C.

On the other hand, polymethylmethacrylate resin (tensile elastic modulus of 2.8 GPa) containing an elastic particle with the number average particle size of 0.4 μm and an ultraviolet absorbing agent (LA31; made by ADEKA Corporation) were mixed so that the concentration of the ultraviolet absorbing agent became 3 weight % so as to have a mixture (water absorption coefficient of 0.3%, photoelastic coefficient of $-4.0\times10^{-12}$ $Pa^{-1}$, haze of 0.1%, and humidity expansion coefficient of 30 ppm/% RH. Noted as "$R^1$-PMMA" in Table). This was inputted to a double-flight type uniaxial extruder with a leaf-disk shaped polymer filter with an opening of 10 μm, and a molten resin was supplied to the other of multi-manifold die with a die slip having surface roughness Ra of 0.1 μm at an extruder outlet temperature of 260° C.

And the polymethylmethacrylate resin in the molten state not containing the elastic particulate and the polymethylmethacrylate resin in the molten state containing the elastic particulate and an ultraviolet absorbing agent were discharged, respectively, from the multi-manifold die at 260° C. and cast to a cooling roll whose temperature was adjusted to 130° C., and then, passed between the cooling rolls whose temperature were adjusted to 50° C. so as to obtain a protective film 3A for polarizing plate with the width of 600 mm and the thickness of 80 μm in a three-layers structure of the PMMA layer (20 μm)/$R^1$-PMMA layer (40 μm)/PMMA layer (20 μm) by coextrusion molding. The protective film 3A for polarizing plate had moisture permeability of 51 g/($m^2$·24 h), photoelastic coefficient of $-5\times10^{-12}$ $Pa^{-1}$, and a difference in humidity expansion coefficient between adjacent layers at 2 ppm/% RH, and its surface was a flat face without linear recess portion or linear projection portion. The $R^1$-PMMA layer had the refractive index at the wavelength 380 nm at 1.507 and the refractive index at the wavelength 780 nm at 1.489.

An acrylic adhesive was applied onto both faces of the polarizer P, and a face of the protective film 3A for polarizing plate and the corona-discharge processed face of the film 2B were faced with the polarizer P and stacked and bonded by a roll-to-roll method so as to obtain a bonded polarizing plate 5. Evaluation results are shown in Table 1 and Table 2.

Example 6

Polymethylmethacrylate resin including an elastic particle (water absorption coefficient of 0.3%, photoelastic coefficient of $-5.0\times10^{-12}$ $Pa^{-1}$, haze of 0.1%, humidity expansion coefficient of 30 ppm/% RH, tensile elastic modulus of 2.8 GPa. Abbreviated as "$R^2$-PMMA".) was inputted to a double-flight type uniaxial extruder with a leaf-disk shaped polymer filter with an opening of 10 μm, and a molten resin was supplied to one of multi-manifold die with a die lip having surface roughness Ra of 0.1 μm at an extruder outlet temperature of 260° C.

A protective film 3B for polarizing plate with the width of 600 mm and the thickness of 40 μm in a three-layers structure of the $R^2$-PMMA-layer (10 μm)/$R^1$-PMMA layer (20 μm)/$R^2$-PMMA layer (10 μm) by coextrusion molding was obtained by the same manner as Example 5 except that R-PMMA was used instead of PMMA in Example 5. The protective film 3B for polarizing plate had moisture permeability of 105 g/($m^2$·24 h), photoelastic coefficient of $-4.5\times10^{-12}$ $Pa^{-1}$, and a difference in humidity expansion coefficient between adjacent layers at 2 ppm/% RH, and its surface was a flat face without linear recess portion or linear projection portion. The $R^2$-PMMA layer had the refractive index at the wavelength 380 nm of 1.507 and the refractive index at the wavelength 780 nm of 1.489.

On one face of the triacetyl cellulose film with the thickness of 80 μm, 25 mL/$m^2$ of 1.5 mol/L isopropylalcohol solution of potassium hydroxide was applied and dried at 25° C. for 5 seconds. Then, it was washed by running water for 10 seconds, the surface of the film was dried by blowing air of 25° C. finally, and only one surface of the triacetyl cellulose film was saponified so as to obtain a film 4A.

An acrylic adhesive was applied onto both faces of the polarizer P, and a face of the protective film 3B for polarizing plate and the corona-discharge processed face of the film 4A were faced with the polarizer P and stacked and boned by a roll-to-roll method so as to obtain a polarizing plate 6. Evaluation results are shown in Table 1 and Table 2.

Comparative Example 1

A protective film 5A for polarizing plate in a three-layer structure was fabricated be the same manner as Example 1 except that polycarbonate resin (water absorption coefficient of 0.2%, photoelastic coefficient of $70\times10^{-12}$ $Pa^{-1}$, haze of 0.08%, humidity expansion coefficient of 32 ppm/% RH, tensile elastic modulus of 2.5 GPa. Abbreviated as "PC", water absorption coefficient of 0.2%) was used instead of the alicyclic olefin polymer in example 1. Moreover, a polarizing plate 7 was obtained by the same manner as Example 1 except that the film 5A was used instead of the film 1A. The protective film 5A for polarizing plate had moisture permeability of 22 g/($m^2$·24 h), photoelastic coefficient of $27\times10^{-12}$ $Pa^{-1}$, and a difference in humidity expansion coefficient between adjacent layers at 13 ppm/% RH, and its surface was a flat face without linear recess portion or linear projection portion. The polycarbonate resin layer had distribution of the refractive index n(λ) shown in FIG. 1 and the polymethylmethacrylate layer had distribution of the refractive index n(λ) shown in FIG. 1.

FIG. 2 shows distribution of absolute values of a difference between the refractive index n(λ) of the polymethylmethacrylate resin layer and the refractive index n(λ) of the polycarbonate resin layer. The polymethylmethacrylate resin layer and the polycarbonate resin layer did not satisfy the relationship in the formula [1]. Evaluation results are shown in Table 1 and Table 2.

Comparative Example 2

A protective film 6A for polarizing plate in a three-layer structure was fabricated by the same manner as Example 3 except that polyethylene terephthalate film with the thickness of 30 μm (water absorption coefficient of 0.5%, photoelastic coefficient of $120\times10^{-12}$ $Pa^{-1}$, haze of 0.08%, humidity expansion coefficient of 12 ppm/% RH, tensile elastic modulus of 5 GPa. Abbreviated as "PET") was used instead of triacetyl cellulose film in example 3. Moreover, a polarizing plate 8 was obtained by the same manner as example 3 except that the film 6A replaced the film 2A. The protective film 6A for polarizing plate had moisture permeability of 54 g/($m^2$·24 h), photoelastic coefficient of $50\times10^{-12}$ $Pa^{-1}$, and a difference in humidity expansion coefficient between adjacent layers at 16 ppm/% RH. The surface of the protective film 6A for polarizing plate was a surface on which a linear recess portion with the depth or the like of 20 nm or more and 50 nm or less and the width in the range of 500 nm or more and less than 800 nm and the like were formed. The polyethylene terephthalate resin layer had distribution of the refractive index n(λ) shown in FIG. 1 and the polymethylmethacrylate resin layer had distribution of the refractive index n(λ) shown in FIG. 1

FIG. 2 shows distribution of absolute values of a difference between the refractive index n(λ) of the polymethylmethacrylate resin layer and the refractive index n(λ) of the polyethylene terephthalate resin layer. The polymethylmethacrylate resin layer and the polyethylene terephthalate resin layer did not satisfy the relationship in the formula [1]. Evaluation results are shown in Table 1 and Table 2.

Comparative Example 3

A polarizing plate 9 was obtained by the same manner as Example 1 except that a film obtained by single-layer extrusion molding with the thickness of 80 μm made of polymethylmethacrylate resin (noted as PMMA) was used as a protective film 7A for polarizing plate instead of the protective film 1A for polarizing plate in example 1. The protective film 7A for polarizing plate had moisture permeability of 40 g/($m^2$·24 h) and photoelastic coefficient of $-6\times10^{-12}$ $Pa^{-1}$, and the surface was a surface on which a linear recess portion with the depth or the like of 20 nm or more and 50 nm or less and the width in the range of 500 nm or more and less than 800 nm and the like were formed. FIG. 1 shows the refractive index n(λ) of the single-layer film layer of polymethylmethacrylate.

TABLE 1

| | Film # | | | | | | |
|---|---|---|---|---|---|---|---|
| | 1A | 2A | 3A | 3B | 5A | 6A | 7A |
| | PMMA COP PMMA | PMMA TAC PMMA | PMMA $R^1$-PMMA PMMA | $R^2$-PMMA $R^1$-PMMA $R^2$-PMMA | PMMA PC PMMA | PMMA PET PMMA | PMMA |
| Moisture permeability [g/$m^2$ · 24 h] | 3.5 | 61 | 51 | 105 | 22 | 54 | 4 |
| Photoelastic coefficient [$\times10^{-12}$ $Pa^{-1}$] | 1 | 3 | −5 | −4.5 | 27 | 50 | −6 |
| Humidity expansion coefficient difference [ppm/% RH] | 27 | 37 | 2 | 2 | 13 | 16 | — |
| Linear recess and projection | ◎ | ◎ | ◎ | ◎ | ◎ | ○ | ○ |

(Tensile Elastic Modulus)

A thermoplastic resin was molded to obtain a single-layer film with the thickness of 100 μm, this was cut out to the size of 1 cm×25 cm as a test piece, which was measured under the condition of a tensile velocity of 25 mm/min using a tensile tester (TENSILON UTM-10T-PL, by ORIENTEC Co., LTD. (former name is TOYO Baldwin Co. Ltd.)) based on ASTM D882. The 5 measurements were conducted and their arithmetic average value was made as a representative value of tensile elastic modulus.

(Film Thickness)

A film was embedded in epoxy resin, and then it was sliced using microtome (by Yamato Kogyo co., ltd., RUB-2100). The section was observed and measured using a scanning electron microscope.

(Transmittance)

In compliance with ASTM D1003, measurement was made using "Turbid meter NDH-300A" by Nippon Denshoku Industries Co. Ltd. The 5 measurements were conducted and their arithmetic average value was set as a representative value of the transmittance of all light rays.

(Refractive Index n(λ) of Thermoplastic Resin Layer)

A thermoplastic resin was molded to obtain a single-layer film and the refractive indexes at wavelengths of 633 nm, 407 nm and 532 nm were measured under the condition of a temperature of 20±2° C. and humidity of 60±5% using a prism coupler (by Metricon corporation, model 2010), and refractive indexes in 380 nm to 780 nm were calculated from the measured refractive indexes by Caucy's dispersion formula.

(Refractive Index of Antireflection Layer)

Using fast spectral ellipsometer (by J.A.Woollam, M-2000U), a spectrum in a wavelength region of 400 to 1000 nm was measured at incident angles of 55, 60, and 65 degrees under the condition of a temperature of 20±2° C. and humidity of 60±5%, and the refractive index was measured from the measurement result.

(Water Absorption Coefficient)

This was measured at 23° C. for 24 hours in compliance with JIS K7209.

(Haze)

This was measured in compliance with JIS K7105 by "Turbid meter NDH-300A" by Nippon Denshoku Industries Co. Ltd. The 5 measurements are conducted and their arithmetic average value was set as a representative value of haze.

(Moisture Permeability of Resin)

A resin molded article with the thickness of 100 μm was prepared, and this was measured under test conditions of being left in an environment of a temperature at 40° C. and at 92% R.H. for 24 hours using a method conforming to the cup method according to JIS Z0208. The unit of the moisture permeability is g/($m^2$·24 h).

(Photoelastic Coefficient)

Under a condition of a temperature at 20±2° C. and humidity at 60±5%, measurement was made using a photoelastic coefficient measuring device (by Uniopt Corporation, Ltd., PHEL-20A).

(Humidity Expansion Coefficient)

A film sample was cut in accordance with a test piece type 1B described in JIS K7127 so that the width direction became a measuring direction and set at a tensile tester with high-temperature constant-humidity bath (by Instron), a nitrogen atmosphere with humidity at 35% RH and 23° C. or a nitrogen atmosphere with humidity at 70% RH and 23° C. was kept, the length of each sample at that time was measured, and the humidity expansion coefficient was calculated by the following formula. The measuring direction was a longitudinal direction of a cut-out sample, measurement was made five times, and their average value was made as the humidity expansion coefficient.

$$\text{Humidity expansion coefficient}=(L_{70}-L_{35})/(L_{35}\times\Delta H)$$

However, $L_{35}$: Sample length at 35% RH (mm)

$L_{70}$: Sample length at 70% RH (mm)

ΔH: 35 (=70−35) % RH (Linear Recess Portion and Linear Projection Portion on Film Surface)

By the above-mentioned method, the depth of the linear recess portion, the height of the linear projection portion, and their widths were measured. The maximum values of the obtained recess portion depth and the projection portion height, the width of the recess portion and the width of the projection portion indicating the maximum value were made as the linear recess portion depth and the linear projection portion height and their widths of the film and evaluated based on the following standards.

◎: The linear recess portion depth or the linear projection portion height was less than 20 nm and the width was 800 nm or more.

○: The linear recess portion depth or the linear projection portion height was 20 nm or more and 50 nm or less and the width was 500 nm or more and less than 800 nm.

x: The linear recess portion depth or the linear projection portion height exceeded 50 nm and the width was less than 500 nm.

were measured, and the measurement values were assigned to the following formula so as to calculate the light leakage degree.

$$\text{Light leakage degree}=(T_2+T_4+T_6+T_8)/4)/((T_1+T_3+T_5+T_7+T_9)/5)$$

$T_x$ represents light transmittance at a measurement point (x), and positions from the end portion by 10 mm were set as measurement points of (1), (2), (3), (4), (6), (7), (8), and (9). For the point (5), a measurement point was an intersection of diagonal lines of the polarizing plate for test.

○: Light leakage degree was 2 or less.

x: Light leakage degree was more than 2.

(Polarization Change)

The polarizing plate was cut into the size of a 10-inch square and bonded to one face of a glass plate with the face

TABLE 2

| | Ex. | | | | | | Comp. Ex. | | |
|---|---|---|---|---|---|---|---|---|---|
| | 1 | 2 | 3 | 4 | 5 | 6 | 1 | 2 | 3 |
| Polarizing plate | 1 | 2 | 3 | 4 | 5 | 6 | 7 | 8 | 9 |
| Protective film | 1A | 1A | 2A | 1A | 3A | 4A | 5A | 6A | 7A |
| Polarizer | PVA | PVA | PVA | PVA | PVA | PVA | PVA | PVA | PVA |
| Protective film | 1B | 2B | 1B | 1B | 2B | 3B | 1B | 1B | 1B |
| Interference fringe | ○ | ○ | ◎ | ◎ | ◎ | ◎ | Δ | X | ◎ |
| Pencil hardness | 2H | 2H | 2H | 4H | 2H | H | 2H | 3H | 4H |
| Reflectivity | 4 | 4 | 4 | 0.6 | 4 | 4 | 4 | 4 | 4 |
| Light leakage degree | ○ | ○ | ○ | ○ | ○ | ○ | ○ | X | ○ |
| Polarization change | ○ | ○ | ○ | ○ | ○ | ○ | ○ | ○ | ○ |
| Lamination strength | ○ | ○ | ○ | ○ | ○ | ○ | ○ | ○ | ○ |
| Flexibility | ○ | ○ | ○ | ○ | ○ | ○ | ○ | ○ | X |
| Visibility | ○ | ○ | ○ | ○ | ○ | ○ | X | X | ○ |

(Observation of Interference Fringes)

The protective film for polarizing plate was placed on a black cloth such as a blackout curtain not transmitting light and lighted by a three-wavelength fluorescent light (National: FL20SS·ENW/18), and the surface of the protective film for polarizing plate was visually observed and evaluated based on the following standards:

◎: No interference fringe was found.

○: Slight interference fringe was found.

Δ: Interference fringes were conspicuous.

x: Interference fringes were conspicuous and caused glaring.

(Pencil Hardness)

In compliance with JIS K5600-5-4 except that the test load was 500 g, a pencil inclined at an angle of 45 degrees and applied with a load of 500 g was used to scratch the surface of the protective film for polarizing plate (visible side) for approximately 5 mm and the scratch degree was checked.

(Reflectivity)

A black vinyl tape No. 21(by Nitto Denko) was affixed to one face of the protective film for polarizing plate (a face to be bonded to the polarizer), a reflectance spectrum at an incident angle of 5° on the other face of the protective film for polarizing plate was measured using a spectrophotometer (by JASCO Corporation: "Ultraviolet-Visible-Near-Infrared Spectrophotometer V-570") so as to acquire a reflectance (%) at the wavelength of 550 nm.

(Light Leakage Degree)

Figure 4:
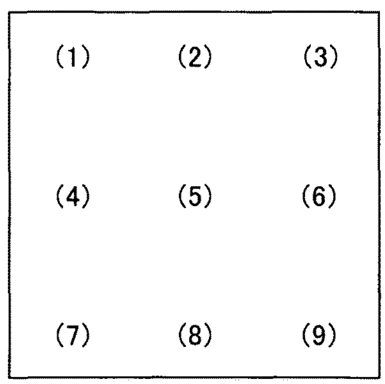
FIG. 4 is a diagram illustrating measurement points of polarization degree and transmittance in Examples and Comparative Examples.

Two polarizing plates for test were crossed-nicols arranged so that the protective films B were opposed to each other, light transmittance at 9 locations shown in FIG. 4 of the protective film B of the polarizing plate faced with the glass plate side through a pressure-sensitive adhesive so as to fabricate a polarizing plate for test. This polarizing plate for test was left in a constant-temperature bath with a temperature of 60° C. and a humidity of 90% for 500 hours, and a fluctuation band of the polarization degree at an intersection of diagonal lines (position of (5) in the figure) of the polarizing plate for test was measured before and after being left in the high temperature and high humidity condition.

○: A fluctuation band of polarization degree was 0.5 or less.

x: A fluctuation band of polarization degree was more than 0.5.

(Lamination Strength)

An operation to leave a polarizing plate in a constant-temperature constant-humidity chamber of 80° C. and 95% RH for 24 hours, and then, in a constant-temperature constant-humidity chamber of 20° C. and 40% RH for 24 hours was repeated 20 times. The lamination states between each layers of the protective film and between the polarizer and the protective film were visually observed and evaluated with x: if there was a portion separated for the length not shorter than 1 mm from the end j of the polarizing plate and appearing white ○: when the length was shorter than 1 mm.

(Flexibility of Polarizing Plate)

A polarizing plate was punched into a film piece of 1 cm×5 cm. This obtained film piece was wrapped around a steel rod of 3 mmΦ and tested to see if the wrapped film piece was broken at the rod or not. The test was conducted ten times in total, and the flexibility was represented by the number of times it was not broken based on the following index.

○: The number of broken film pieces was 1 or less.

x: The number of broken film pieces was 2 or more.

(Visibility)

A liquid crystal display panel was removed from a commercial liquid crystal TV, and instead of a polarizing plate arranged on the visible side, the polarizing plate fabricated in Example or Comparative example was installed (so that the protective film A was on the visible side) to reassemble the liquid crystal display.

At dark display mode and bright display mode of the re-assembled liquid crystal display, brightness was measured using a color brightness meter (by Topcon corporation, color brightness meter BM-7) from an angle slanted to the front face. A ratio between the brightness of the bright display mode and the brightness of the dark display mode (=brightness of bright display mode/brightness of dark display mode) was calculated and set as contrast (CR). The larger is the contrast, the more excellent is the visibility.

Next, the polarizing plate on which the second protective film for polarizing plate will be described below based on Examples and Comparative example. The following evaluation was made in addition to the above evaluation.

(Fabrication of Second Protective Film R1 for Polarizing Plate)

An undrawn film with the thickness of 100 μm made of alicyclic olefin polymer resin (by Zeon Corporation, ZEONOR 1420R) was obtained by extrusion. This undrawn film was uniaxial-drawn in the machine direction with a temperature of 138° C. and drawing magnification of 1.41 times in a drawing machine of a float-type between rolls, and then, was uniaxial-drawn in the transverse direction with a temperature of 138° C. and drawing magnification of 1.41 times by an drawing machine using a tenter so as to obtain the second protective film R1 for polarizing plate. The obtained second protective film R1 for polarizing plate had Re of 50 nm and Rth of 130 nm measured at the wavelength 550 nm. Re is retardation in the film plane.

(Fabrication of Second Protective Film R2 for Polarizing Plate)

(Preparation of Dope)

The following materials were mixed in predetermined quantity, the mixture was inputted into a sealed container, the temperature of the mixture was gradually raised to 45° C. over 60 minutes while being agitated for dissolution. Inside of the container was adjusted to 1.2 atmosphere. The solution was filtered using Azumi filterpaper No. 244 produced by Azumi Filterpaper Co., ltd., and then left for one night so as to obtain dope.

Cellulose ester (acetyl group substitution degree of 2.88): 30 parts by weight

Cellulose ester (acetyl group substitution degree of 2.52): 70 parts by weight

Tryphenyl phosphate: 3 parts by mass

Methylphthalylethylglycolate: 4 parts by mass

Tinuvin 109 (Ciba Specialty Chemicals): 3 parts by mass

Methylene chloride: 455 parts by mass

Ethanol: 36 parts by mass

Retardation increasing agent shown in the following chemical formula 1: 5 parts by mass

[Chemical formula 1]

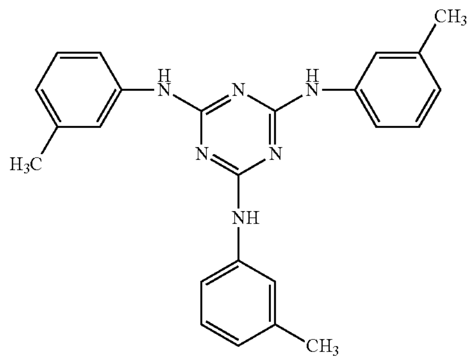

(Fabrication of Film)

The dope prepared as above was cast at a dope temperature of 30° C. onto a stainless belt (also called as a support for casting) so as to form a web. Hot water at the temperature of 25° C. was brought into contact from the back face of the stainless belt and the web was dried on the temperature-controlled stainless belt for 1 minute, and then cool water at the temperature of 15° C. was further brought into contact with the back face of the stainless belt and held for 15 seconds. The web was separated from the stainless belt. A remaining solvent amount in the web at the separation was 100% by mass. Then, the both ends of the separated web were grasped by clips using a tenter and the film was drawn with the drawing magnification of 1.15 by changing the clip interval in the transverse direction. The film temperature at that time was adjusted to 140° C. so as to obtain the second protective film R2 for polarizing plate with the film thickness of 60 μm. The second protective film R2 for polarizing plate had Re of 50 nm and Rth of 145 nm measured at the wavelength 550 nm.

Example 7

(Formation of Antireflection Layer)

On both faces of the protective film 1A for polarizing plate, corona discharge processing was applied using a high-frequency transmitter (output of 0.8 KW) so as to have a surface tension of 0.055 N/m. Next, the composition H for forming a high refractive-index layer was applied on one face of the corona-discharge treated protective film 1A for polarizing plate using a die coater and it was dried in a drying furnace at 80° C. for 5 minutes. Moreover, ultraviolet was irradiated (integrated ultraviolet level of 300 mJ/cm$^2$) and a hard-coat layer with the thickness of 3 μm was formed so as to have a laminated film C. The refractive index of the hard-coat layer was 1.62 and the pencil hardness was 4H.

On the hard-coat layer side of the laminated film C, the composition L for forming a low refractive-index layer was applied using a wire bar coater and left to be dried for 1 hour, and the obtained film was heat-treated under an oxygen atmosphere at 120° C. for 10 minutes to form a low refractive-index layer with the thickness of 100 nm (refractive index of 1.37), and a protective film for polarizing plate having an antireflection function (first protective film D for polarizing plate) was obtained.

(Fabrication of Polarizing Plate CP1 for Observer Side)

An acrylic adhesive was applied to both faces of the polarizer P, and one face of the first protective film D for polarizing plate and the corona-discharge treated face of the second protective film R1 for polarizing plate were faced with the polarizer P and stacked by a roll-to-roll method so as to obtain a polarizing plate CP1 for observer side.

(Fabrication of Polarizing Plate BP1 for Back-Light Side)

An acrylic adhesive was applied to both faces of the polarizer P, and one face of the first protective film 1A for polarizing plate and the corona-discharge treated face of the second protective film R1 for polarizing plate were faced with the polarizer P and stacked by a roll-to-roll method so as to obtain a polarizing plate BP1 for back-light side.

Configuration of the polarizing plate CP1 for observer side will be specifically described referring to the attached drawings.

Figure 5:
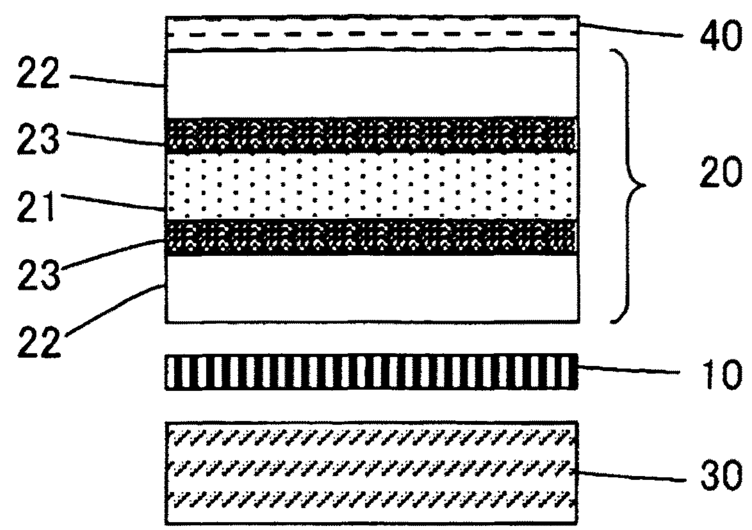
FIG. 5 is a view schematically illustrating a polarizing plate on which the second protective film for polarizing plate of the present invention is laminated.
Figure 6:
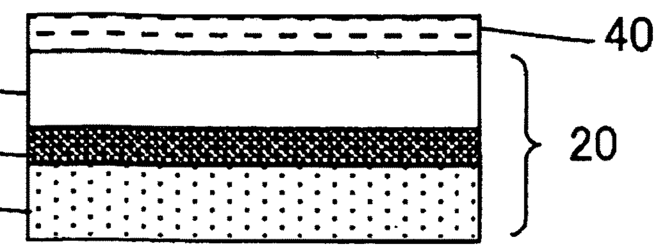
FIG. 6 is a view schematically illustrating a polarizing plate on which the second protective film for polarizing plate of the present invention is laminated.
Figure 6:
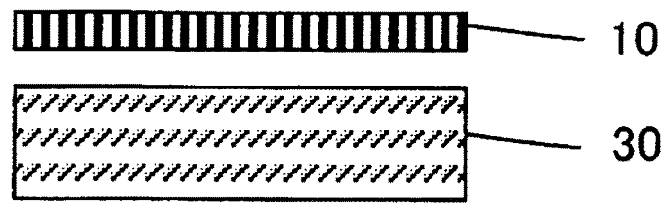

As shown in FIG. 5 or 6, the polarizing plate comprises a polarizer 10, a first protective film 20 for polarizing plate laminated on the front surface of the polarizer 10 (face on the upper side in the figure), and a second protective film 30 for polarizing plate laminated on back surface of the polarizer 10 (face on the lower side in the figure).

The first protective film 20 for polarizing plate shown in FIG. 5 comprises resin layer 21 to be an intermediate layer and resin layers 22 laminated on the front and back faces of the resin layer 21 so as to hold the resin layer 21 between them through an adhesive layer 23, respectively. That is, the first protective film for polarizing plate was in a three-layer configuration except the adhesive layer. On the surface of the resin layer 22, an antireflection layer 40 was laminated.

The first protective film 20 for polarizing plate shown in FIG. 6 comprises resin layer 21 and resin layer 22 laminated on the surface of the resin layer 21 through the adhesive layer 23. That is, the first protective film for polarizing plate was in a two-layer configuration except for the adhesive layer. On the surface of the resin layer 22, the antireflection layer 40 was laminated.

When such polarizing plate was used in a liquid crystal display, the polarizing plate can be arranged at least either one of the observer side and the back-light side of the liquid crystal panel. At this time, the display mode of the liquid crystal panel may be TN (Twisted Nematic) mode, VA (Vertical Alignment) mode or IPS (In Plane Switching) mode.

(Fabrication of Liquid Crystal Display)

The polarizing plate CP1 for observer side was bonded on one face of a liquid crystal cell in the vertical alignment mode with the thickness of 2.74 μm, positive dielectric anisotropy, birefringence index at the wavelength 550 nm of Δn=0.09884, and a pretilt angle of 90° with the protective film R1 for polarizing plate on the liquid crystal panel side, while the polarizing plate BP1 for back-light side was bonded with the protective film R1 for polarizing plate on the liquid crystal panel side so as to fabricate a liquid crystal display 1. Evaluation result is shown in Table 2.

Example 8

A polarizing plate CP2 for observer side and a polarizing plate BP2 for back-light side were obtained by the same manner as Example 7 except that the second protective film R2 for polarizing plate was used instead of the second protective film R1 for polarizing plate so as to fabricate a liquid crystal display 2. Evaluation result is shown in Table 2.

Example 9

(Fabrication of Liquid Crystal Display 3)

A first protective film E for polarizing plate was obtained by the same manner as Example 7 except that the protective film 3A for polarizing plate was used instead of the protective film 1A for polarizing plate, a polarizing plate CP3 for observer side was obtained using the first protective film E for polarizing plate, and a polarizing plate BP2 for back-light side was obtained so as to fabricate a liquid crystal display 3.

Example 10

(Fabrication of Liquid Crystal Display 4)

The first protective film E for polarizing plate was obtained by the same manner as Example 8 except that the protective film 3A for polarizing plate was used instead of the protective film 1A for polarizing plate, a polarizing plate CP4 for observer side was obtained using the first protective film E for polarizing plate, and a polarizing plate BP4 for back-light side was obtained so as to fabricate a liquid crystal display 4.

Example 11

(Fabrication of Liquid Crystal Display 5)

A polarizing plate CP5 for observer side and a polarizing plate BP5 for back-light side were obtained by the same manner as Example 9 except that the protective film 3B for polarizing plate was used instead of the second protective film R1 for polarizing plate in Example 9. A liquid crystal cell in the in-plane switching mode with the thickness of 2.74 μm, positive dielectric anisotropy, birefringence index at the wavelength 550 nm of Δn=0.09884, and a pretilt angle of 0° was used. On one face of this liquid crystal cell, the polarizing plate CP5 for observer side was bonded with the delay phase axis of the protective film 3B for polarizing plate in parallel with rubbing direction of the liquid crystal cell and the protective film 3B for polarizing plate was on the liquid crystal cell side. Then, the polarizing plate BP5 for back-light side was bonded in the crossed-nicols arrangement so as to obtain a liquid crystal display 5.

TABLE 3

| | Ex. 7 | Ex. 8 | Ex. 9 | Ex. 10 | Ex. 11 |
|---|---|---|---|---|---|
| Liquid crystal display | 1 | 2 | 3 | 4 | 5 |
| Polarizing plat on observer side | CP1 | CP2 | CP3 | CP4 | CP5 |
| First protective film for polarizing plate | D | D | E | E | E |
| Polarizer | PVA | PVA | PVA | PVA | PVA |
| Second protective film for polarizing plate | R1 | R2 | R1 | R2 | 3B |
| Liquid crystal cell mode | VA | VA | VA | VA | IPS |
| Polarizer plate on back-light side | BP1 | BP2 | BP3 | BP4 | BP5 |
| First protective film for polarizing plate | R1 | R2 | R1 | R2 | 3B |
| Polarizer | PVA | PVA | PVA | PVA | PVA |
| Second protective film for polarizing plate | 1A | 1A | 3A | 3A | 3A |
| Reflectivity | 0.8 | 0.8 | 0.6 | 0.7 | 0.7 |
| Color fluctuation | ○ | ○ | ○ | ○ | ○ |
| Viewing angle evaluation | ○ | ○ | ○ | ○ | ○ |

TABLE 3-continued

| | Ex. 7 | Ex. 8 | Ex. 9 | Ex. 10 | Ex. 11 |
|---|---|---|---|---|---|
| Uneven color evaluation | ○ | ○ | ○ | ○ | ○ |
| Pencil hardness | >4H | >4H | >4H | >4H | >4H |
| Interference fringes | ○ | ○ | ○ | ○ | ○ |
| Flexibility | ○ | ○ | ○ | ○ | ○ |

(Retardation)

An arbitrary point at the center part of a film was measured under the condition of a temperature at 20±2° C. and humidity at 60±5% using an automatic birefringence measurement (by Oji Scientific Instruments, KOBRA21-ADH).

(Color Fluctuation)

L* value, a* value, and b* value of a L*a*b* color space were calculated from reflection spectrum of specular reflection to a 5°-incident light of a CIE standard light source D65 in a region with the wavelength of 380 to 780 nm, and ΔL* value, Δa* value, and Δb* value were acquired as differences for the L*, a*, and b* measured at the arbitrary two locations separated by 10 cm, respectively, and they were assigned in a formula of $\Delta Eab^*=(\Delta L^{*2}+\Delta a^{*2}+\Delta b^{*2})^{1/2}$. Evaluation is made based on the following standards:

○: ΔEab*<2.0 x: ΔEab*>2.0

(Evaluation of View Angle Characteristic)

For the fabricated liquid crystal display, ratio (contrast) of brightness in black display mode to white display mode was measured using brightness photometer (Ez-Contrast160D, by ELDIM). If a contrast value measured from a direction inclined by 0 to 80° in all directions with the normal line of the display screen as a reference was 10 or more, it was indicated by a circle mark, while it was a cross mark if the value was less than 10.

(Uneven Color Evaluation Test)

The liquid crystal display fabricated in the evaluation test for the liquid crystal display performance was set in dark-display mode and left for 300 hours with the temperature of 60° C. and humidity of 90%. After that, the entire dark-displayed display screen in a dark room was observed from the direct front and evaluated based on the following indexes:

○: Generally even black display and no light leakage.

Δ: Uneven color in dark display was found in top and bottom and right and left of a frame.

x: Light leakage was found in top and bottom and right and left of a frame.

(Flexibility Test)

The protective film for polarizing plate was punched into a test film of 1 cm×5 cm. This obtained test film was wrapped around a steel rod of 3 mmΦ and tested to see if the wrapped film was broken at the rod or not. The test was conducted ten times in total, and the flexibility was represented by the number of times of not being broken based on the following index.

○: The number of broken film pieces was 1 or less.

x: The number of broken film pieces was 2 or more.

The invention claimed is:

1. A protective film for a polarizing plate, in which the protective film comprises k layers (k is an integer of 2 or more and 7 or less) of thermoplastic resin which are laminated, wherein:

the protective film is obtained by coextrusion, at least one layer (A) of the laminated thermoplastic resin layers comprises a thermoplastic resin having a negative photoelastic coefficient, the thermoplastic resin having a negative photoelastic coefficient comprises at least one selected from the group consisting of polymethylmethacrylate resin, polystyrene, poly-α-methylstyrene, and ethylene-tetracyclododecene addition copolymer, at least one layer (B) of the laminated thermoplastic resin layers comprises a thermoplastic resin having a positive photoelastic coefficient, the thermoplastic resin having a positive photoelastic coefficient comprises at least one selected from the group consisting of polycarbonate resin, polysulphone resin, polyalirate resin, polyethersulphone resin, polyethyleneterephthalate resin, ring-opening polymers of norbornene structure-containing monomer, hydrogenated products of the ring-opening polymer, and triacetyl cellulose, the k th thermoplastic resin layer has a tensile elastic modulus $A_k$ of 2.8 GPa or more, at least one layer of the laminated thermoplastic resin layers has a negative photoelastic coefficient and at least another layer of the laminated thermoplastic resin layers has a positive photoelastic coefficient, and a tensile elastic modulus $A_i$ of the i th thermoplastic resin layer and a tensile elastic modulus $A_{i+1}$ of the i+1 th thermoplastic resin layer are $|A_{i+1}-A_i|\geq 0.5$ GPa for all the value of i, wherein a refractive index $n_i(\lambda)$ at a wavelength in the range from 380 to 780 nm of the i th thermoplastic resin layer and a refractive index $n_{i+1}(\lambda)$ at the wavelength λ, in the range from 380 to 780 nm of the i+1 th thermoplastic resin layer have the relationship in a formula [1 ]:

$$|n_i(\lambda)-n_{i+1}(\lambda)|\leq 0.045 \quad \text{Formula [1]}$$

wherein, i is an integer from 1 to k−1, and the i th and i+1 th thermoplastic resin layers are composed of different materials;

wherein each of the thermoplastic resin layer (A) has a thickness of 10 to 100 μm, each of the thermoplastic resin layer (B) has a thickness of 5 to 100 μm, and the protective film has a thickness of 20 to 200 μm, and wherein an in-plane retardation Re of the protective film at wavelength of 550 nm is 50 nm or less.

2. The protective film for the polarizing plate according to claim 1, wherein the protective film has the absolute value of a photoelastic coefficient of $10\times10^{-12}$ $Pa^{-1}$ or less.

3. The protective film for the polarizing plate according to claim 1, wherein every one of said thermoplastic resin layers is made of a material with a haze of 0.5% or less and contains an amorphous thermoplastic resin, and a humidity expansion coefficient $\beta_i$ of the i th thermoplastic resin layer and a humidity expansion coefficient $\beta_{i+1}$ of the i+1 th thermoplastic resin layer satisfy the relationship of a formula [2]:

$$|\beta_i-\beta_{i+1}|\leq 40 \text{ ppm/\% RH} \quad \text{Formula [2].}$$

4. The protective film for the polarizing plate according to claim 1, wherein at least one layer is a thermoplastic resin layer with a water absorption coefficient of 0.5% or less.

5. The protective film for the polarizing plate according to claim 1, wherein the protective film has a pencil hardness of 4H or more.

6. The protective film for the polarizing plate according to claim 1, wherein a hard-coat layer with a refractive index of 1.6 or more is further provided directly or indirectly on a surface of the k th thermoplastic resin layer.

7. The protective film for the polarizing plate according to claim 1, wherein an antireflection layer is further provided directly or indirectly on a surface of the k th thermoplastic resin layer.

8. The protective film for the polarizing plate according to claim 1, wherein a surface of the k th thermoplastic resin layer is flat, and does not have a linear recess portion with a depth of 50 nm or more and a width of 500 nm or less nor a linear projection portion with a height of 50 nm or more and a width of 500 nm or less.

9. The protective film for a polarizing plate according to claim 1, wherein the k is 2 or more and 3 or less.

10. The protective film for the polarizing plate according to claim 1, wherein the thermoplastic resin has a glass transition temperature of 60 to 200° C.

11. The protective film for the polarizing plate according to claim 1, wherein the thermoplastic resin has a light transmittance in a visible region of 400 to 700 nm in a 1-mm thickness of not less than 80%.

12. The protective film for the polarizing plate according to claim 1, wherein each of the thermoplastic resin layer (B) has a thickness of 10 to 100 μm.

13. The protective film for the polarizing plate according to claim 1, wherein each of the thermoplastic resin layer (A) has a thickness of 10 to 50 μm, and wherein each of the thermoplastic resin layer (B) has a thickness of 10 to 50 μm.

14. The protective film for the polarizing plate according to claim 1, wherein the thermoplastic resin having a negative photoelastic coefficient comprises polystyrene, and wherein the thermoplastic resin having a positive photoelastic coefficient comprises polycarbonate resin.

15. A polarizing plate comprising a polarizer and the protective film for the polarizing plate according to claim 1 laminated on at least one face of the polarizer.

16. The polarizing plate according to claim 15, wherein the polarizer contains polyvinyl alcohol, the protective film for the polarizing plate is laminated with the first thermoplastic resin layer faced with the polarizer side, and a refractive index $n_l(\lambda)$ at a wavelength in the range from 380 to 780 nm of the first thermoplastic resin layer and a refractive index $n_b(\lambda)$ at a wavelength in the range from 380 to 780 nm of the polyvinyl alcohol satisfy the relationship in a formula [3]:

$$|n_l(\lambda)-n_b(\lambda)|\leq 0.05 \quad \text{Formula [3].}$$

17. The polarizing plate according to claim 15, wherein the polarizer contains polyvinyl alcohol, the protective film for the polarizing plate is laminated with the first thermoplastic resin layer faced with the polarizer side, and a refractive index $n_l(380)$ at the wavelength 380 nm and a refractive index $n_l(780)$ at the wavelength 780 nm of the first thermoplastic resin layer and a refractive index $n_b(380)$ at the wavelength 380 nm and a refractive index $n_b(780)$ at the wavelength 780 nm of the polyvinyl alcohol satisfy the relationship in a formula [4]:

$$||n_l(380)-n_b(380)|-|n_l(780)-n_b(780)||\leq 0.02 \quad \text{Formula [4].}$$

18. The polarizing plate according to claim 15, wherein the k is 2 or more and 3 or less.

19. A liquid crystal display comprising at least one polarizing plate according to claim 15 and a liquid crystal panel.

* * * * *